(12) United States Patent
Hein et al.

(10) Patent No.: US 7,837,260 B2
(45) Date of Patent: Nov. 23, 2010

(54) VEHICLE SEAT ASSEMBLY SYSTEM

(75) Inventors: Scott Hein, Plymouth, WI (US); Robert A. Sinur, Milwaukee, WI (US); Mark Farchione, Milwaukee, WI (US); Lara Soltis, Brown Deer, WI (US)

(73) Assignee: Milsco Manufacturing Company, Milwaukee, WI (US)

( * ) Notice: Subject to any disclaimer, the term of this patent is extended or adjusted under 35 U.S.C. 154(b) by 854 days.

(21) Appl. No.: 11/421,461

(22) Filed: May 31, 2006

(65) Prior Publication Data

US 2007/0018488 A1 Jan. 25, 2007

Related U.S. Application Data

(60) Provisional application No. 60/686,469, filed on May 31, 2005.

(51) Int. Cl.
*B62J 1/08* (2006.01)
(52) U.S. Cl. ................... 297/195.12; 297/243
(58) Field of Classification Search ............ 297/195.12, 297/214, 218.3, 219.11, 228.13, 243, 248, 297/440.22; 280/288.4; 248/221.11, 222.12; 403/329

See application file for complete search history.

(56) References Cited

U.S. PATENT DOCUMENTS

| | | | |
|---|---|---|---|
| 2,191,848 A | 2/1940 | Cramer et al. | |
| 2,644,510 A | 7/1953 | Benmax | |
| 3,237,984 A * | 3/1966 | Schneider et al. | ........... 297/248 |
| 3,663,059 A * | 5/1972 | Omlie | ..................... 297/440.2 |
| 4,789,201 A | 12/1988 | Selbert | |
| 4,867,507 A | 9/1989 | Arai | |
| 4,872,724 A * | 10/1989 | Deley et al. | ............... 297/218.4 |
| 5,560,677 A | 10/1996 | Cykana et al. | |
| 5,716,096 A | 2/1998 | Pryde et al. | |
| 5,768,758 A | 6/1998 | Deignan et al. | |
| 5,931,538 A | 8/1999 | Cayet et al. | |
| 5,947,562 A * | 9/1999 | Christofferson et al. | ...................... 297/440.22 |
| 6,070,896 A | 6/2000 | Saiki | |
| 6,273,207 B1 | 8/2001 | Brown | |
| 6,533,361 B1 * | 3/2003 | Pietrzak | .................. 297/440.22 |
| 6,623,071 B2 * | 9/2003 | Kawamoto et al. | ..... 297/195.13 |
| 6,860,359 B2 * | 3/2005 | Tanabe et al. | ............... 180/309 |
| 6,913,099 B2 | 7/2005 | Scott | |
| 2005/0046249 A1 * | 3/2005 | Crumley et al. | .......... 297/218.4 |

FOREIGN PATENT DOCUMENTS

GB  2060367 A * 5/1981

* cited by examiner

*Primary Examiner*—David Dunn
*Assistant Examiner*—Tania Abraham
(74) *Attorney, Agent, or Firm*—Boyle Frederickson, S.C.

(57) ABSTRACT

A seat assembly constructed according to the present invention provides a seat assembly having a cover that is quickly and easily connected to the seat base. The tool and fastener free connection of the seat cover with the seat base provides for a convenient, repeatable, and secure connection of the seat cover with the seat base. A seat assembly constructed according to the present invention also provides for the convenient and expeditious connection of a plurality of seat assembly elements. The fastener free connection between the multiple components of the seat assembly provides for the economical manufacture and assembly of the seat assembly. Such a construction provides a multi-piece seat assembly wherein the components of the seat assembly can be connected without fasteners and without tools.

20 Claims, 20 Drawing Sheets

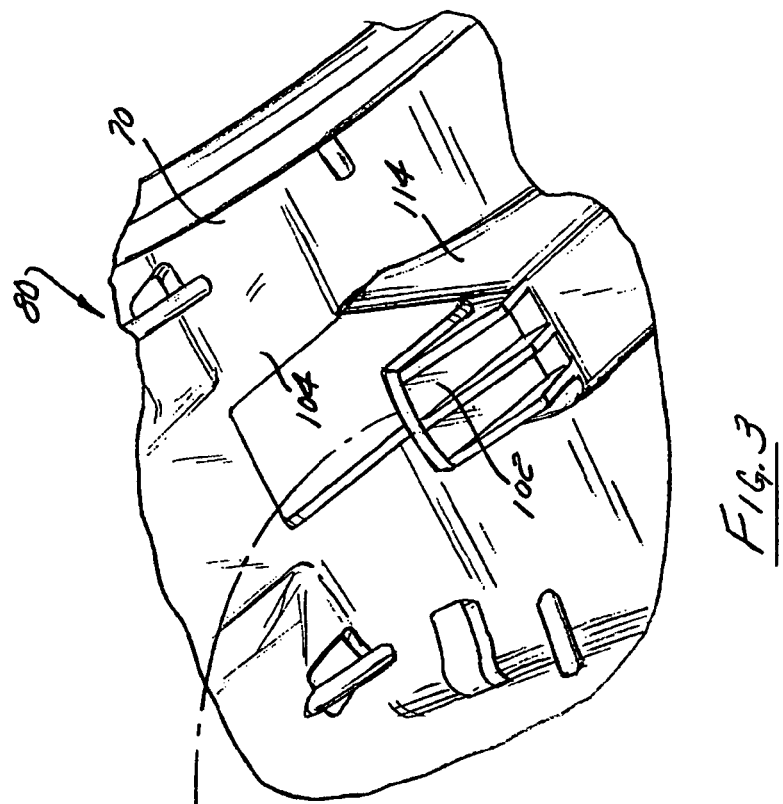
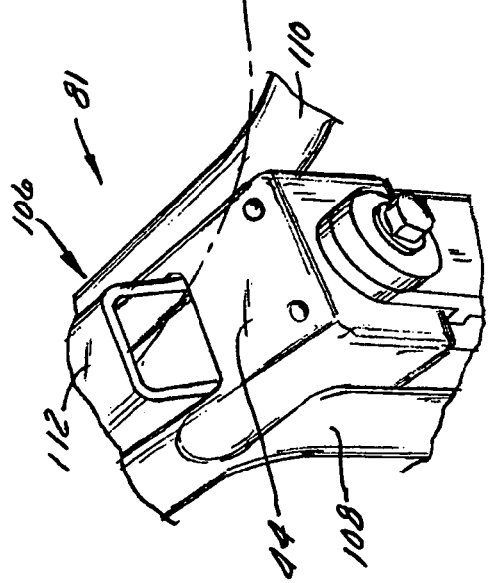
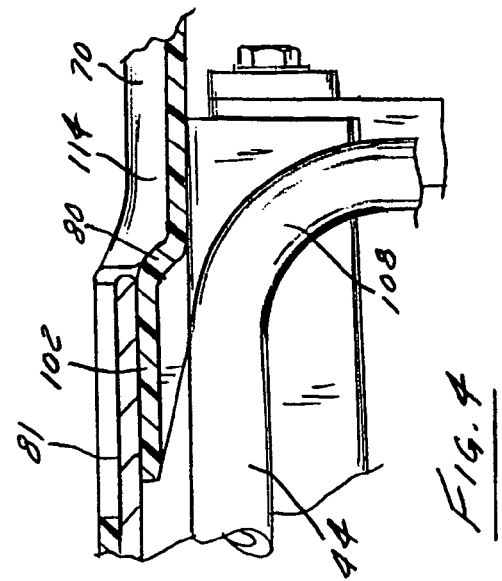
Fig. 3
Fig. 4

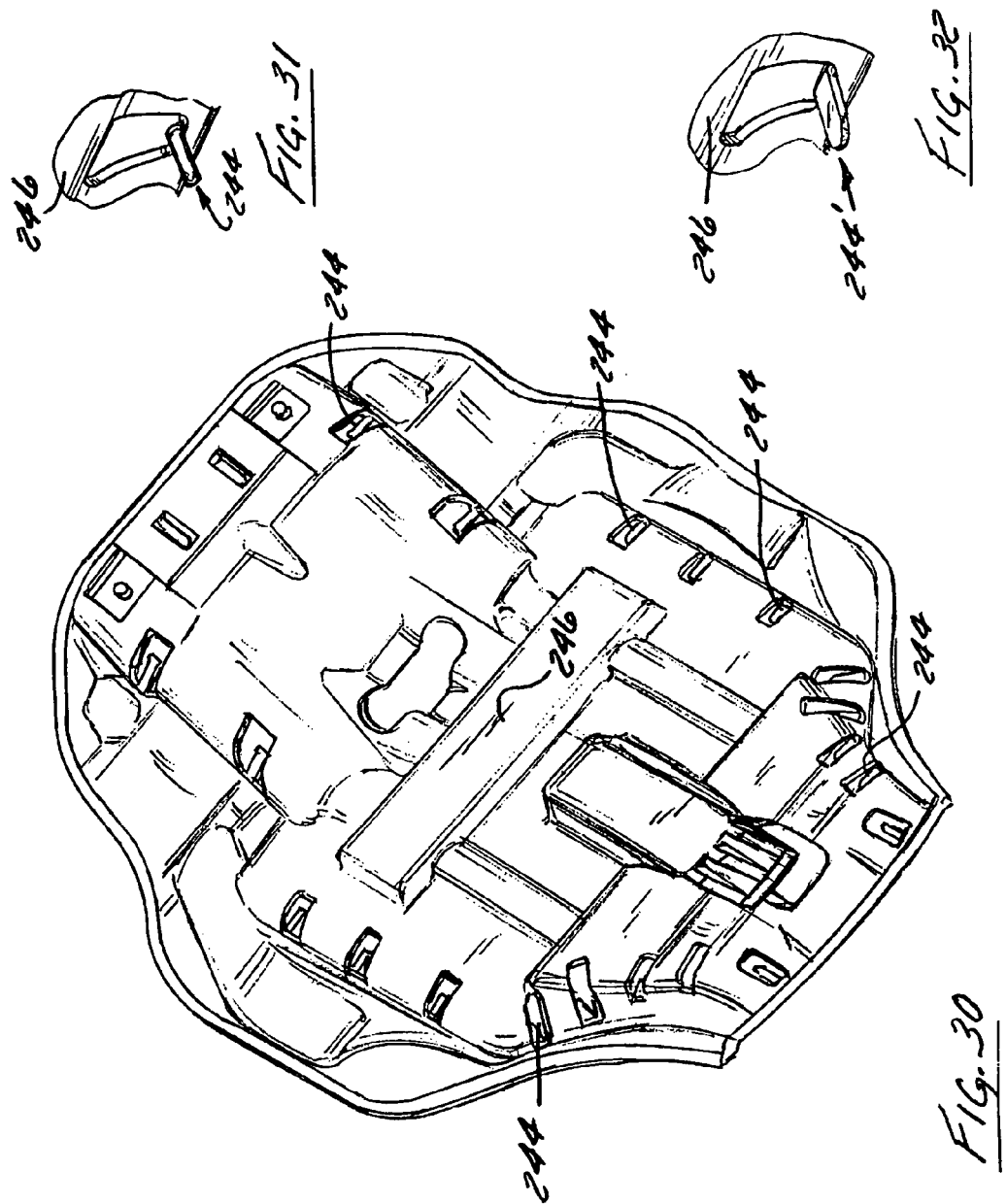

VEHICLE SEAT ASSEMBLY SYSTEM

RELATED APPLICATIONS

This application claims priority based on U.S. Provisional Application Ser. No. 60/686,469 filed on May 31, 2005.

FIELD OF THE INVENTION

The present invention is directed to a seat assembly system that optimizes assembly by minimizing assembly steps and required tooling via a modular seat base coupling arrangement that can be used with a fastener-minimizing integral cover mounting seat base cover, and more particularly to a seat base and coupler that enables modular efficient assembly of a passenger seat base and to a seat base formed with integral seat cover retainers to which a seat cover can be detachably attached.

BACKGROUND OF THE INVENTION

Vehicle seats have traditionally been costly to make because they require so many components such that they tend to be fairly labor intensive. As a result, vehicle seats tend to be costly to make and service.

Vehicle seats typically have a base that provides a framework or support for the rest of the seat. The seat base, also commonly referred to as a seat pan, is structurally more rigid than each seat cushion mounted to it. As a result, the base is what gets connected to the vehicle frame or chassis, whether it be by direct attachment or via a seat slide mechanism designed to permit the seat to be moved forwardly or backwardly.

While made of metal in the past, the present day seat base is almost always formed of plastic because it is cheaper and, in many instances, more versatile. Despite these advantages, it has not changed the fact that vehicle seat assembly still remains a costly assembly intensive process requiring many separate components to complete.

One area where this still is true relates to the components and assembly process required to attach the seat base, and hence the seat, to a vehicle. Mounting brackets used to secure each base of a particular vehicle seat to the vehicle commonly are secondary components that are typically attached to the base before vehicle assembly. Most commonly, the mounting brackets are attached to the seat base when it or some other part of the vehicle seat is being manufactured such that the seat often arrives for vehicle assembly with the mounting brackets pre-assembled.

Presently, either threaded inserts are used to attach the bracket to the base or the bracket itself is incorporated into the base, typically by molding them in place in the base when the base is formed. The use of threaded inserts molded into the base means that the mounting bracket must be attached to the base using threaded fasteners that are threaded into each insert, which undesirably increases part count, assembly steps, and, of course, cost. Molding the bracket in place into the base, which is a common injection molding practice, decreases part cost but often can significantly increase the cost of the injection molding tooling. In addition, the process cycle time to mold a base where the bracket is molded-in-place is slower, which can undesirably significantly increase the total cost to mold the base as a result. Finally, molding the bracket in place limits flexibility because once the bracket is molded, it cannot be removed and changed independent of also changing the entire seat base.

Another area where this is particularly true relates to seat cover attachment to the seat base. Conventional methods for securing the cover to the base typically require separate components, usually fasteners or the like, to attach the cover to the base. Often special tools, equipment, and/or fixtures are also required. For example, staples, clips, cords, wires and hog rings, rivets, adhesives or the like are commonly used to attach a seat cover to a seat base.

While the use of any of these methods is labor intensive and costly, there are other factors that further increase costs. For example, since all of these methods tend to permanently fix the cover to the base, anything that occurs during assembly that results in less than an aesthetically pleasing looking cover often requires the cover be pulled off and scrapped or reattached. This happens far too frequently because seat cover attachment is so dependent on the skill of the assembler that it has been difficult, if not impossible, heretofore to ensure repeatability of seat cover attachment.

Therefore, there is a need to provide a seat assembly system that overcomes one or more of these deficiencies. There also is a need to provide a seat bracket and base arrangement that overcomes at least one of the aforementioned bracket assembly deficiencies. And there is a need for an improved seat cover attachment arrangement and method.

BRIEF DESCRIPTION OF THE INVENTION

The present invention is directed to a seat assembly that overcomes the aforementioned drawbacks. A seat assembly constructed according to the present invention provides a seat assembly having a cover that is quickly and easily connected to the seat base. The tool and fastener free connection of the seat cover with the seat base provides for a convenient, repeatable, and secure connection of the seat cover with the seat base. A seat assembly constructed according to the present invention also provides for the convenient and expeditious connection of a plurality of seat assembly elements. The fastener free connection between the multiple components of the seat assembly provides for the economical manufacture and assembly of the seat assembly. Such a construction provides a multi-piece seat assembly wherein the components of the seat assembly can be connected without fasteners and without tools.

The seat assembly also provides a tool free connection between seat mounting brackets and the seat base. An operator seat and a passenger seat base, which may be constructed using a unitary seat base or independent but connectable operator and passenger bases, and the brackets required to mount the seat to the vehicle are constructed to snapfittingly engage such that the mounting brackets can be secured to the seat base without additional tools.

Therefore, in accordance with one aspect of the present invention, a seat assembly having a cover, mounting brackets, and a base is disclosed. The cover has a generally three dimensional contoured shape that encapsulates the cushion extending to the perimeter of the seat base and a gusset further extending from the perimeter of the seat base along the bottom surface of the seat base. A plurality of openings are formed in the cover generally inboard of the perimeter. The seat assembly includes a base having a plurality of protrusions that extend therefrom. Each protrusion is constructed to engage one of the plurality of openings of the cover to secure the cover to the base. The base or bases also include receiving pockets and retention features incorporated into the receiving pockets that provide for attaching the mounting brackets to the seat base. The mounting brackets contain complimentary features that engage the receiving pockets and retention features of the seat base to secure the attachment of the brackets to the base. The mounting brackets and seat base receiving features are be assembled by rotating and or translating the mounting bracket with respect to the seat base. The retention features in the seat base elastically deform and rebound allowing the retention features to engage the complementary features in the mounting brackets thereby securing the mounting brackets to the seat base.

According to another aspect of the invention, a seat assembly having a base, a pad positioned about a side of the base, and a cover is disclosed. A plurality of hooks project from the base and the cover is tensioned over the pad and toollessly engaged with the plurality of the hooks.

A further aspect of the invention discloses a method of assembling a seat that includes the steps of: (A) compressing a cushion between a base and a cover; (B) toollessly hooking a plurality of openings in the cover to the base; and (C) releasing the compression of the cushion to generally uniformly tension the cover over the base.

In accordance with a further aspect of the present invention, a multi-person motorcycle seat assembly having a first seat and a second seat is disclosed. The first seat is constructed to support an operator and the second seat is constructed to support a passenger.

BRIEF DESCRIPTION OF THE DRAWINGS

The drawings illustrate the best mode presently contemplated of carrying out the invention.

In the drawings:

Preferred exemplary embodiments of the invention are illustrated in the accompanying drawings in which like reference numerals represent like parts throughout and in which:

FIG. 1 is an elevational view of a vehicle equipped with a seat assembly according to a vehicle seat assembly system of the present invention.

Figure 1:
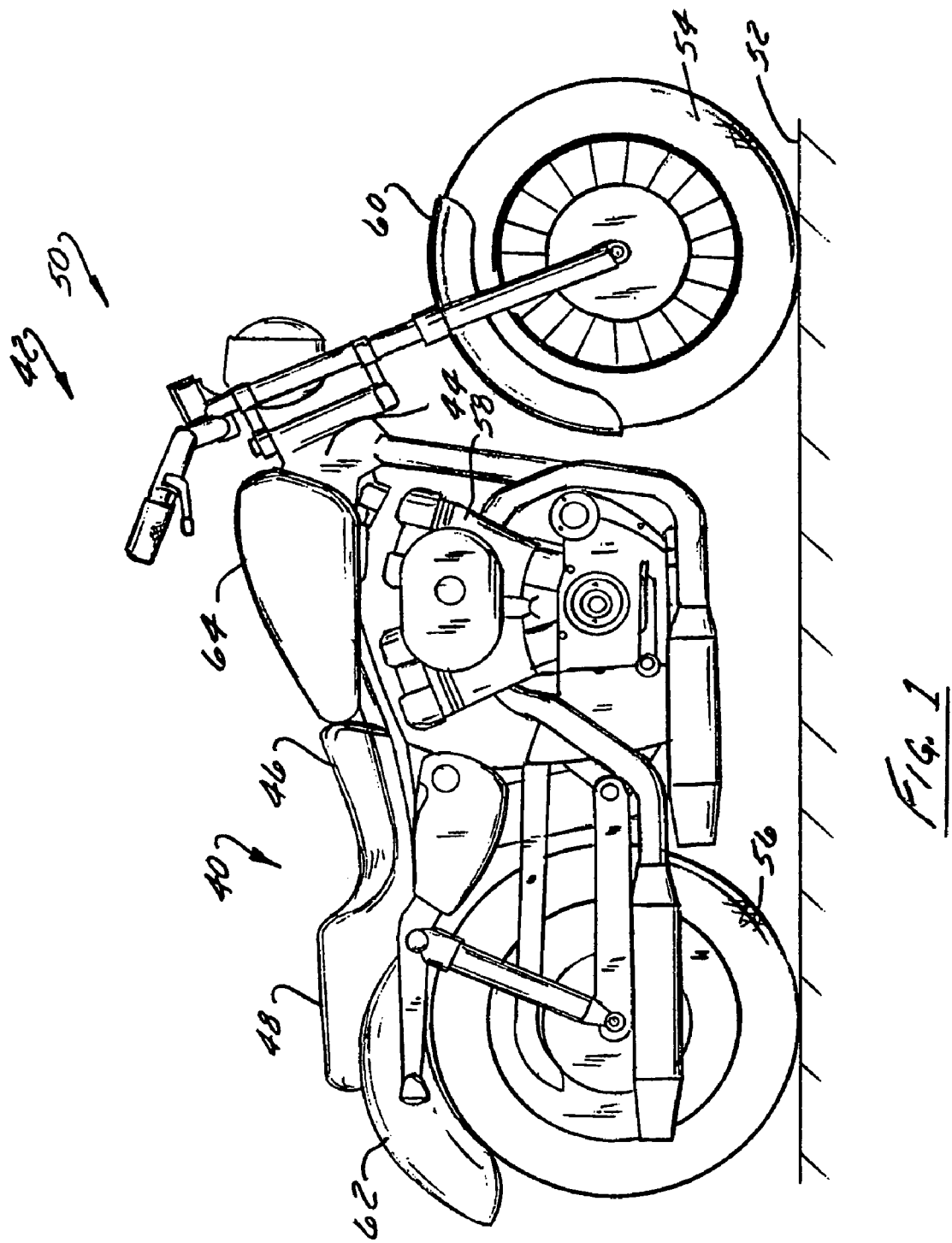
Figure 2:
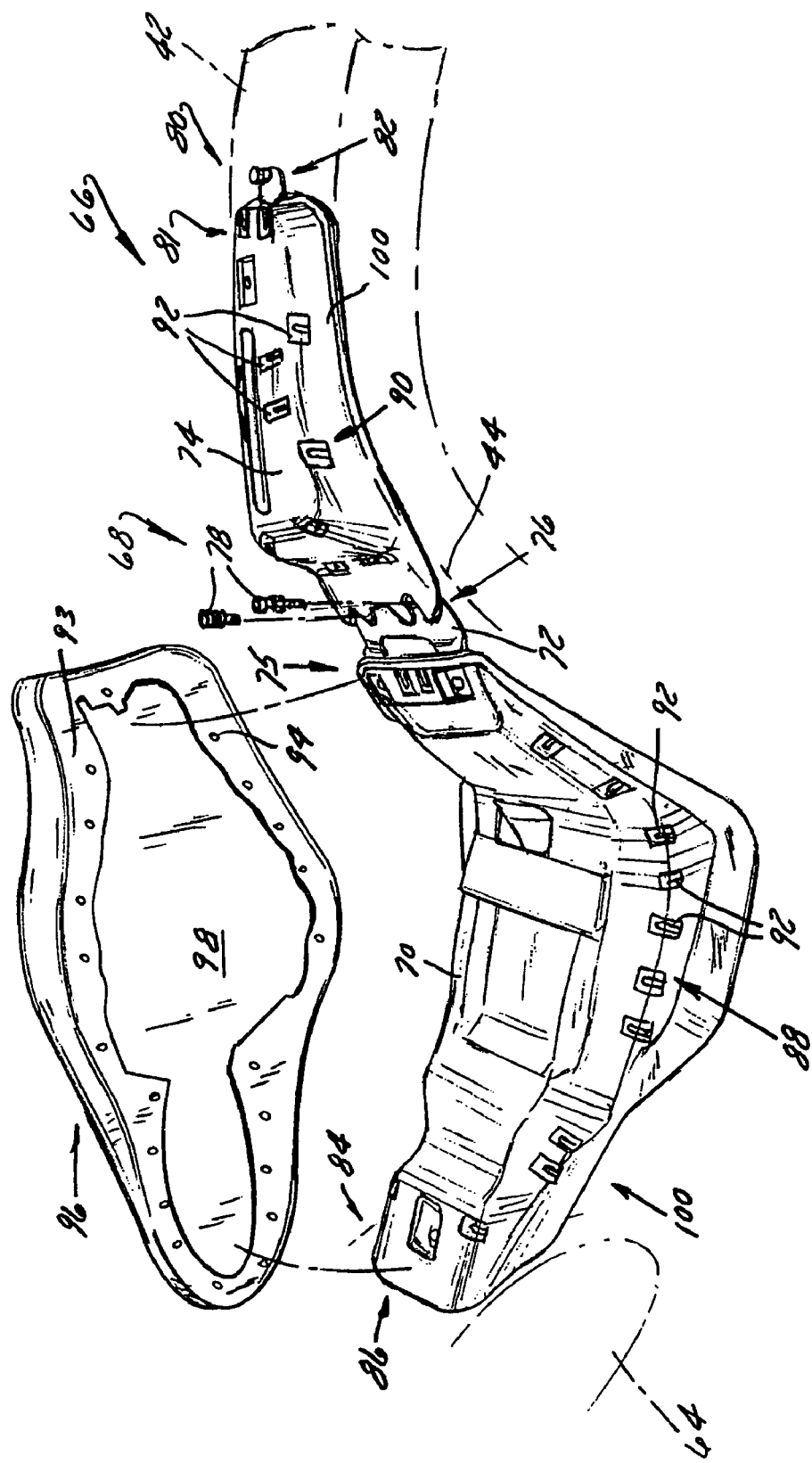
Figure 5:
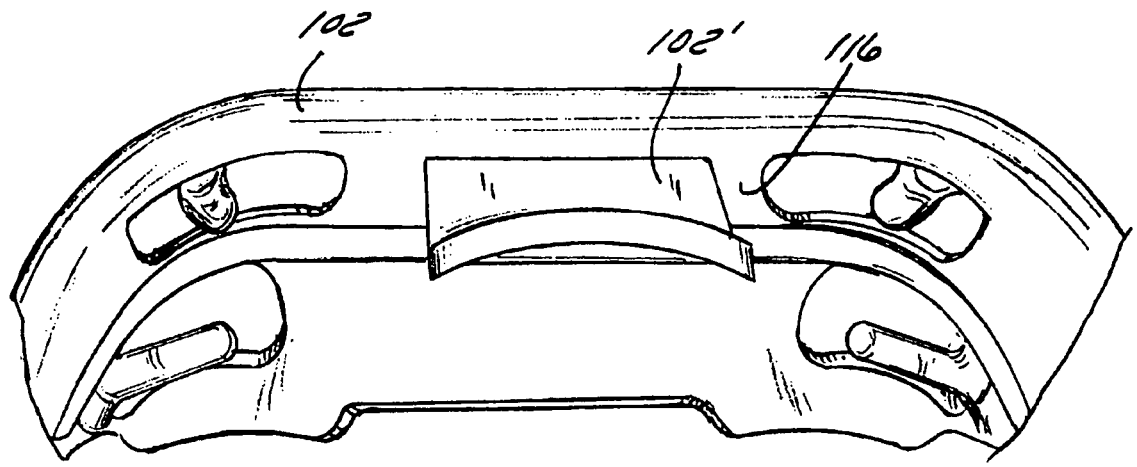
Figure 6:
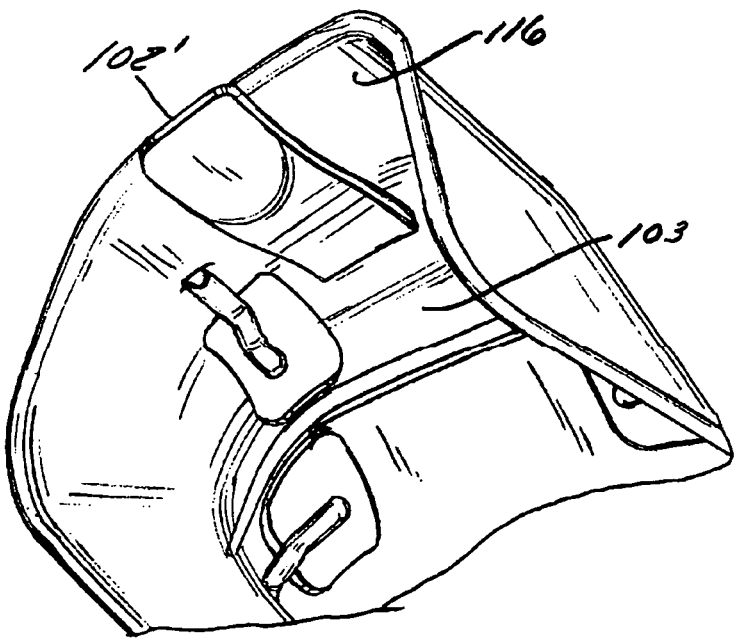
Figure 7:
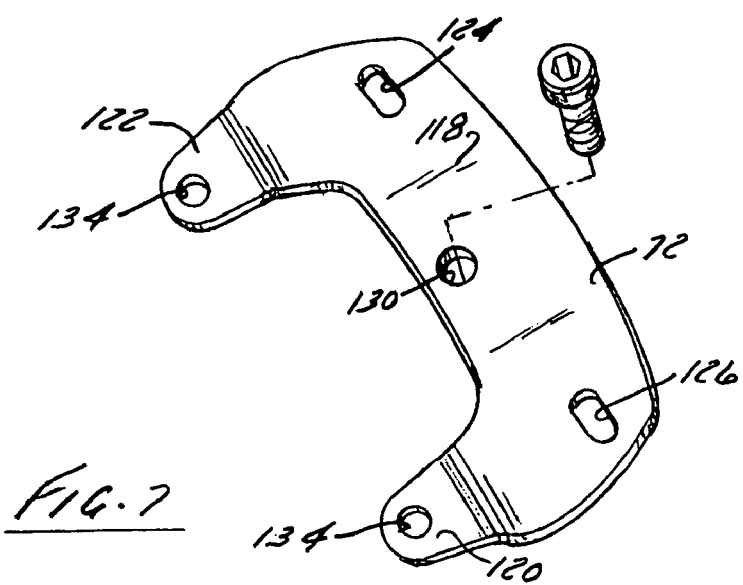
Figure 18:
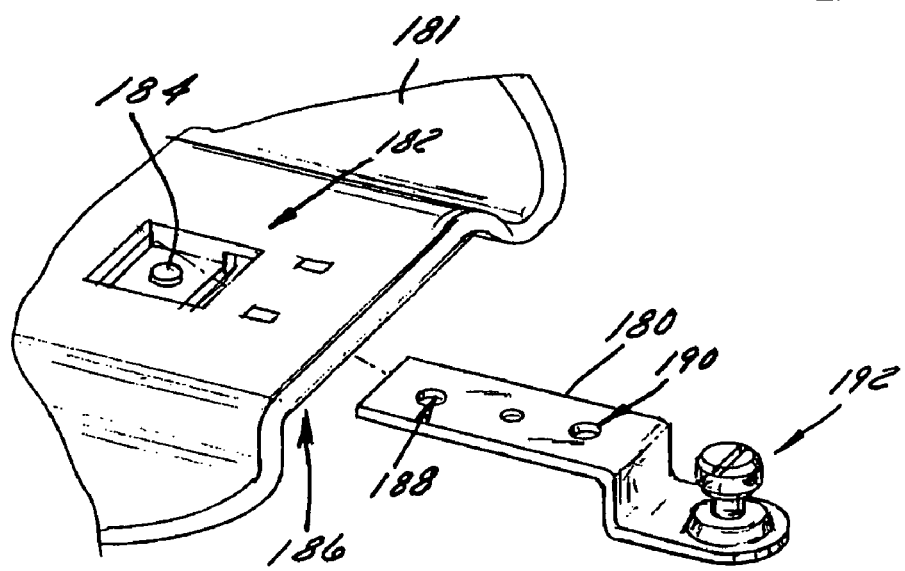
Figure 26:
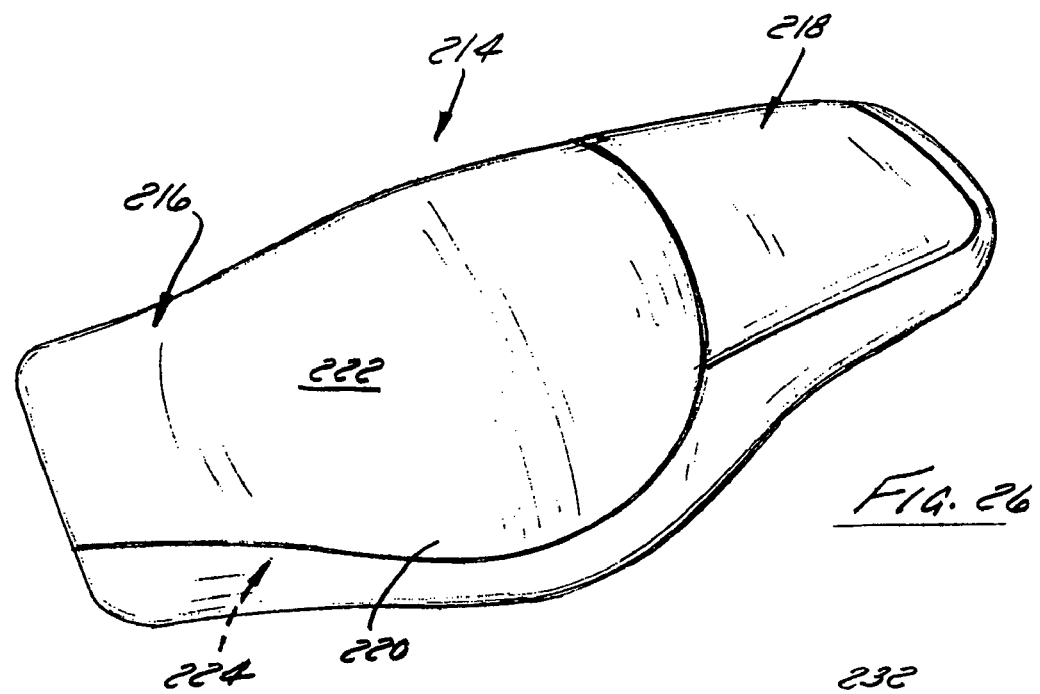
Figure 27:
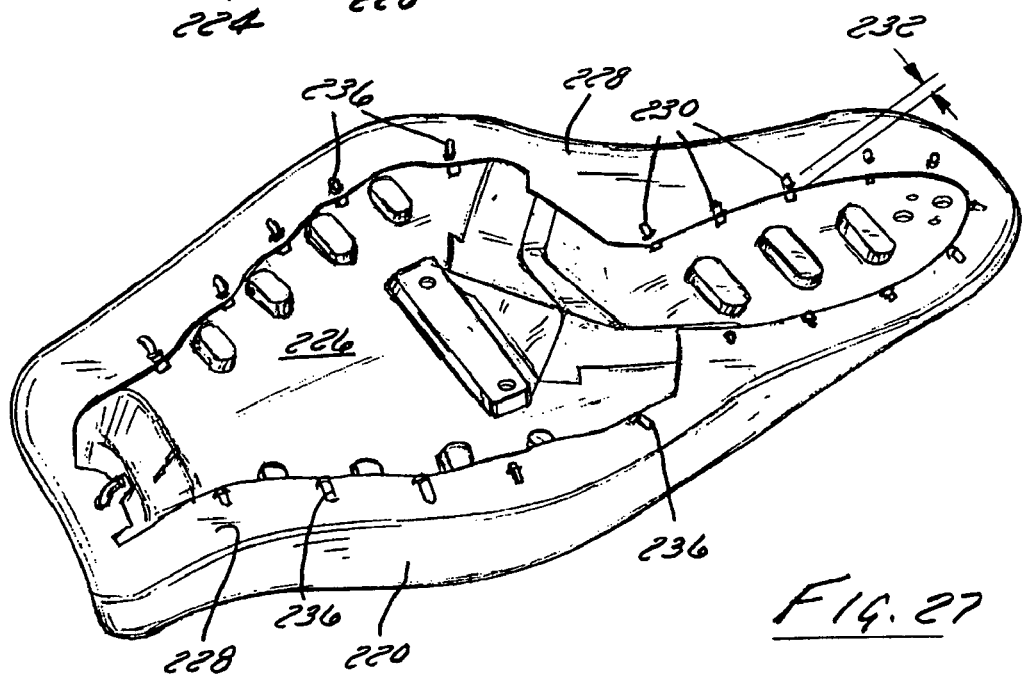
Figure 28:
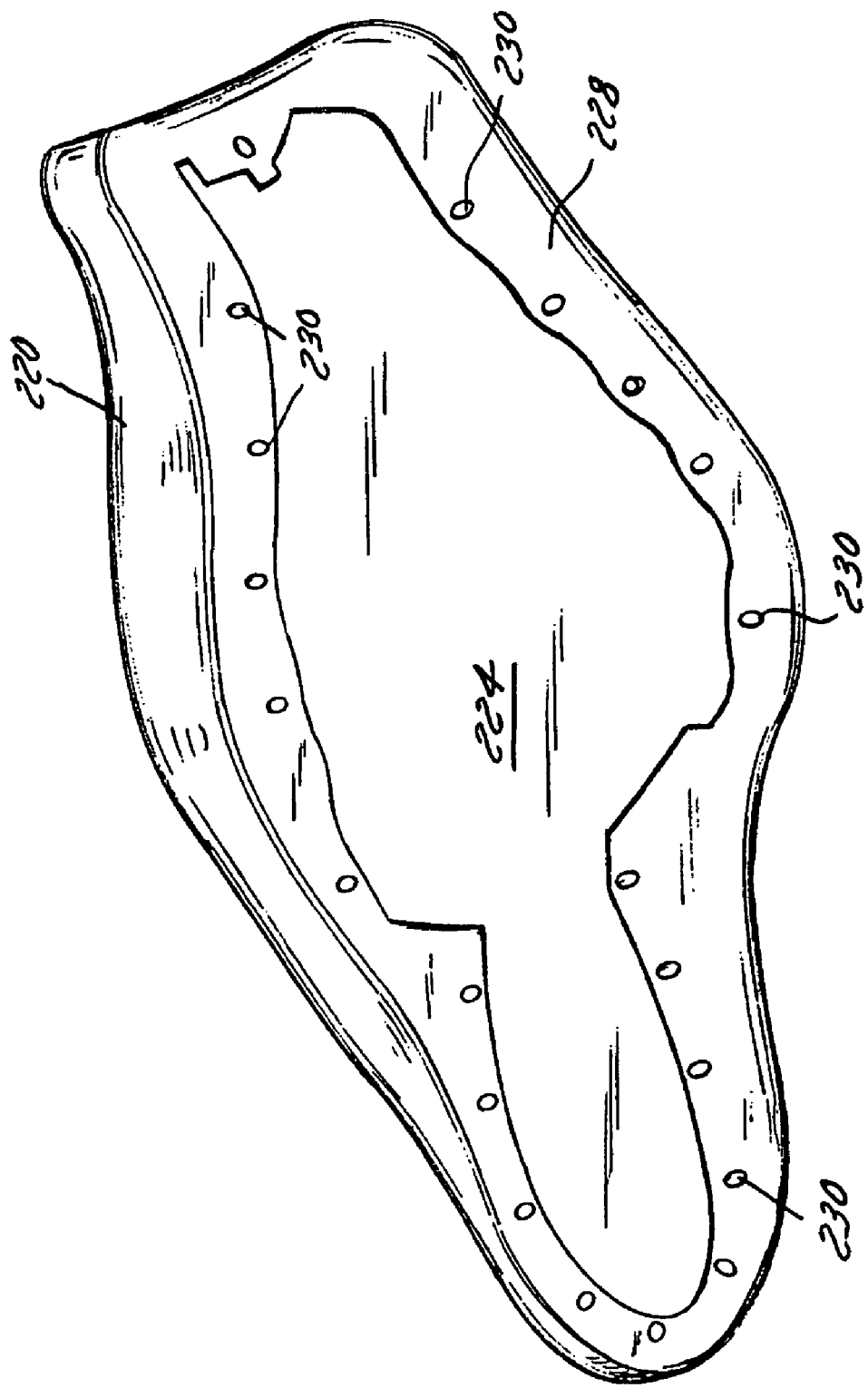
Figure 29:
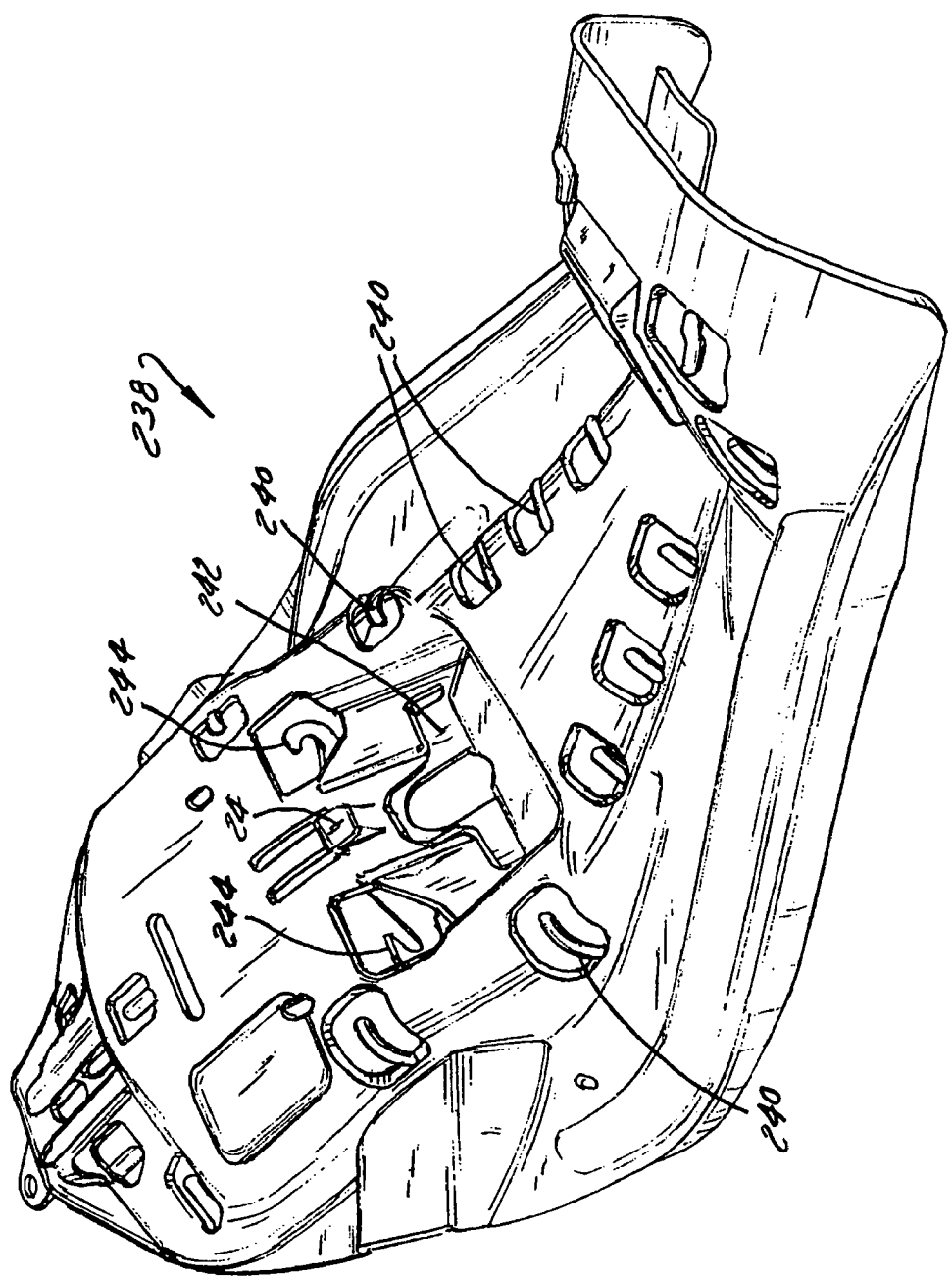
Figure 33:
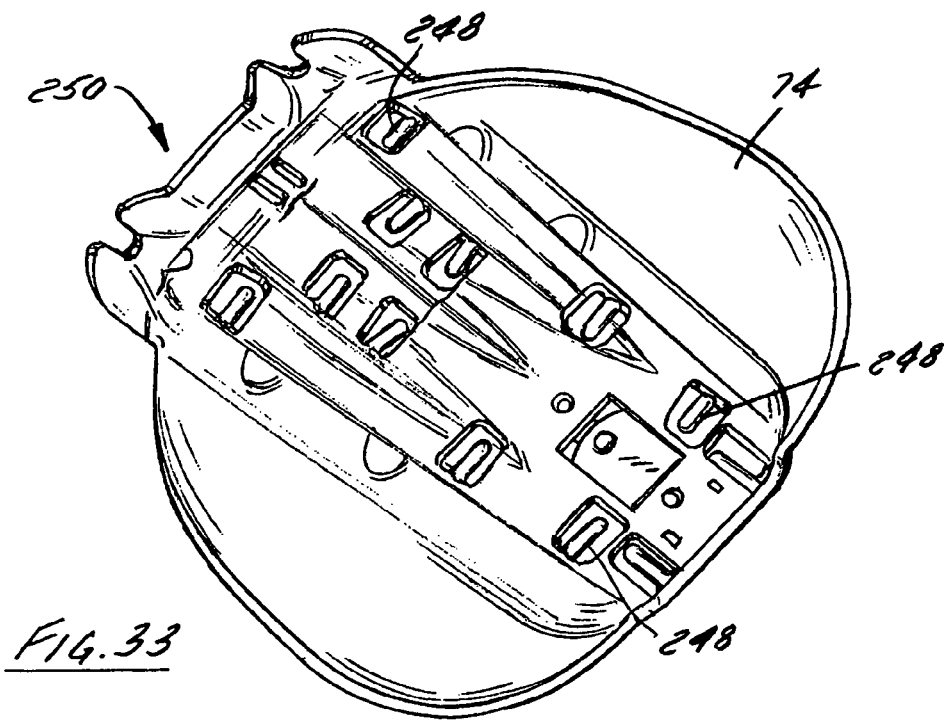
Figure 34:
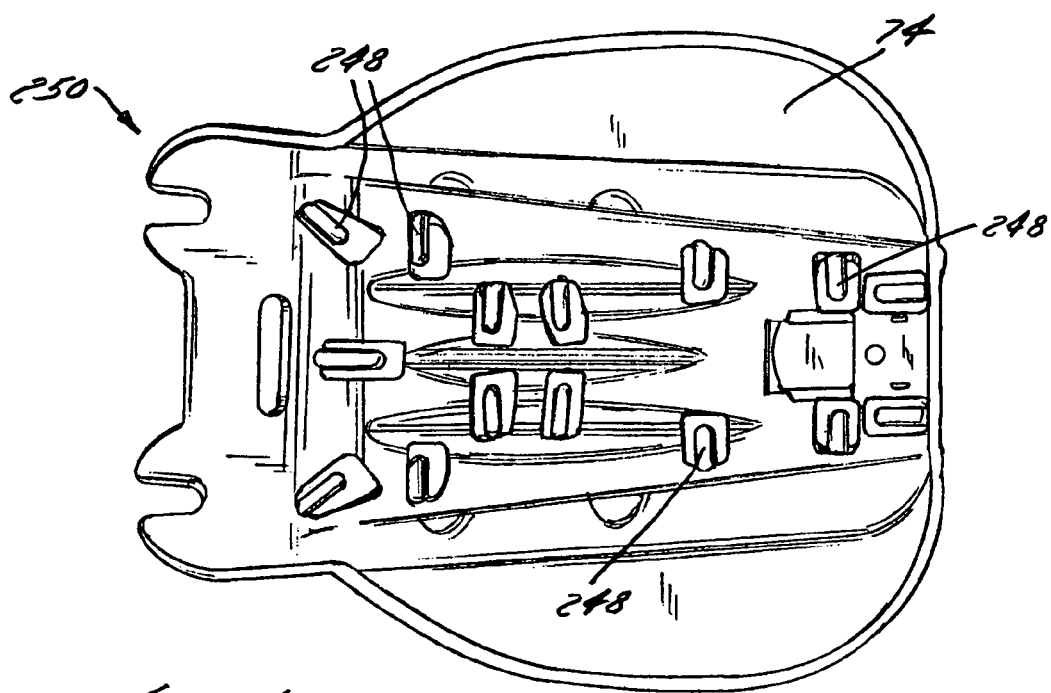
Figure 37:
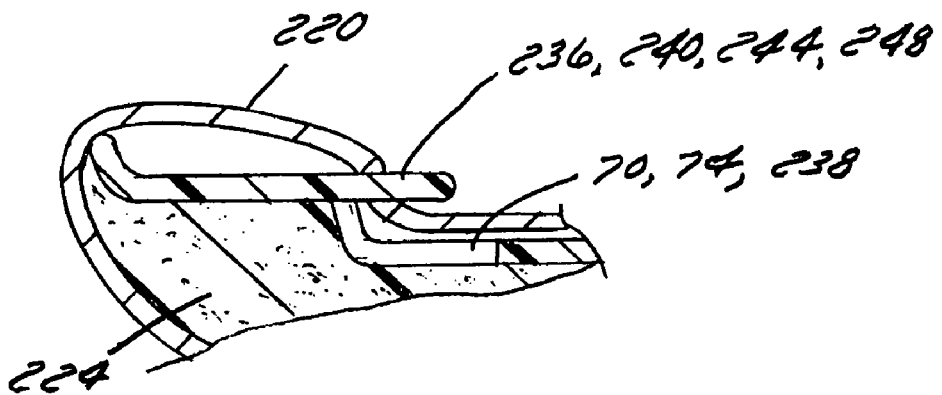
Figure 36:
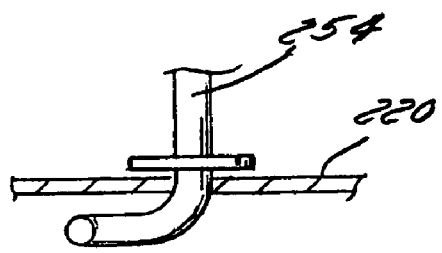
Figure 35:
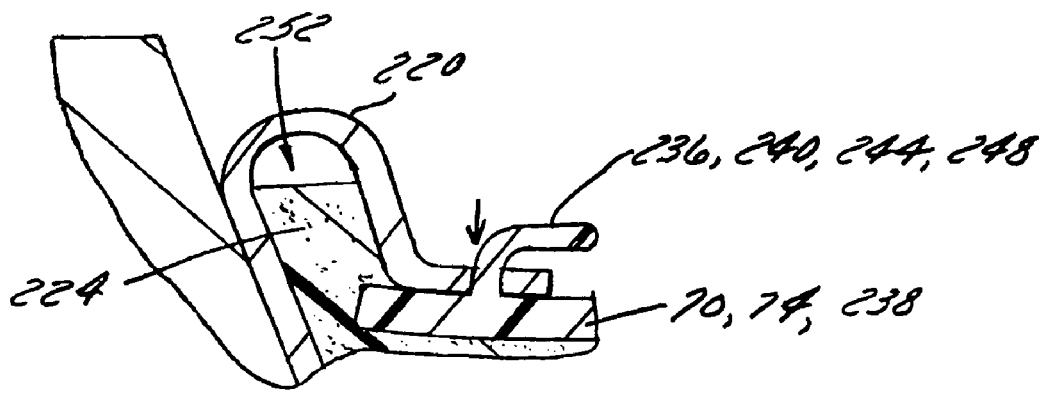

FIG. 2 a top perspective view of a multi-component seat assembly similar to the seat assembly shown in FIG. 1;

FIG. 3 is a bottom perspective view of the seat assembly and vehicle frame shown in FIG. 2 exposing a forward seat connection tab;

FIG. 4 is an elevational view of the connection shown in FIG. 3;

FIG. 5 is a detailed view of one embodiment of hooks of the seat base shown in FIG. 3;

FIG. 6 is a perspective view of a vehicle side of another embodiment of a seat base according to the present invention;

FIG. 7 is a detailed view of connection bracket according to the present invention;

FIGS. 8-16 depict various embodiments of the seat base and connection bracket engagement according to the present invention;

FIG. 17-25 depict various embodiments of the seat base and rear connector plate engagement according to the present invention;

FIG. 26 is a perspective view of a unitary seat assembly according to the present invention;

FIG. 27 is a perspective view of a vehicle side of the seat assembly shown in FIG. 26;

FIG. 28 is a perspective view of a vehicle side of a cover and cushion according to the present invention;

FIG. 29 is a perspective view of an operator side of seat base the connector bracket shown in FIG. 18;

FIG. 30 is perspective view of a vehicle side of another seat base according to the present invention;

FIGS. 31 and 32 show alternate cover retention tangs according to the present invention;

FIG. 33 is a plan view of a pillion base according to the present invention;

FIG. 34 is a plan view of a vehicle side of the pillion base shown in FIG. 33; and FIGS. 35-37 depict a method of connecting a cover to seat base.

Before explaining one or more embodiments of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

FIGS. 1 and 2 illustrate a seat assembly or seat 40 constructed according to the present invention for use with a vehicle, preferably a motorcycle 42, such that it is mounted to part of the motorcycle 42, such as some part of its frame or chassis 44. The seat 40 includes a driver seat saddle 46 located in front of a rider seat or pillion 48. Understandably, depending in part on the construction of the underlying vehicle, the rider seat of pillion may be formed integrally with the driver seat saddle 46 or may be removably connected thereto via a pillion bracket as is discussed further below. It is also appreciated that the present invention is applicable to other vehicle seat configurations and constructions and is not limited to motorcycle seat constructions. That is, a seat 40 constructed in accordance with the present invention is well suited for use in engine powered vehicles, such as automobiles, such as cars and trucks, recreational vehicles, such as snowmobiles, ATVs, and boats, and off-road vehicles, such as riding lawnmowers, tractors, backhoes, graders, front end loaders, and the like. It can also be adapted for use with self-powered vehicles, such as bicycles and the like, which lack a fuel-powered prime mover, e.g. engine or motor.

As is shown in FIG. 1, the motorcycle 42 has a steering arrangement 50, preferably handlebars, located forward of the seat 40. The motorcycle 42 is supported on a traveling surface 52 by front and rear wheels 54 and 56, at least one of which are driven by a prime mover 58, e.g., an internal combustion engine, during operation. If desired, a fender 60 and 62 can overlie part of each corresponding wheel 54 and 56. The seat 40 is carried by a part of the frame 44 that underlies the seat 40 with the seat 40 is preferably located between a fuel tank 64 and the rear fender 62 of the motorcycle 42.

FIG. 2 illustrates a vehicle seat assembly 66 constructed in accordance with a vehicle seat assembly system of the present invention that advantageously provides manufacturing flexibility by incorporating component and subassembly modularity while decreasing manufacturing costs by reducing assembly steps and components needed, particularly by minimizing fastener use. The seat assembly 66 includes a modularly expandable seat base arrangement 68 that includes at least one seat base 70, where the vehicle is a motorcycle 42 preferably a driver seat base, that can be coupled by a frame-mountable horseshoe-shaped anchor bracket 72 to another seat base 74, preferably a pillion base. To facilitate quick and easy assembly, the bracket 72 is received in a bracket cradle arrangement 75 that is integrally formed in the base 70 and which is configured to releasably but positively engage the bracket 72.

Where a particular motorcycle lacks or does not need a pillion or passenger seat or seat segment, the anchor bracket 72 serves only to secure the rear of the main or driver seat base 70 to an adjacent part 76 of the frame 44 that underlies the base 74 and bracket 72. Where the pillion base 74 is needed or desired, the anchor bracket 72 couples the driver seat base 70 to the pillion base 74 using a pair of fasteners 78 that each engages part of the bracket 72 and part of the pillion base 74.

A cantilevered elongate anchor bracket plate 80 preferably is employed to frame mount the end of one or both bases 70 and 74 that is located opposite the base end that engages the anchor bracket 72. The bracket plate 80 cooperates with a bracket receptacle 81 integrally formed in the base, in the case of FIG. 2 being part of the pillion base 74 located adjacent its rear end, enabling quick and easy snap-fit assembly of the bracket plate 80 to the base 74 in a manner that requires no fasteners and that preferably also requires no tools. The bracket plate 80 is shown in FIG. 2 in releasable but positive engagement with part 82 of the frame 44 at or adjacent the rear fender 62 (FIG. 1). In the preferred embodiment shown in FIG. 2, the front of the driver seat base 70 includes a frame mounting arrangement 84 that engages a forwardly located part 86 of the frame 44 adjacent the motorcycle fuel tank 64 to secure the front of the base 70 to the frame 44.

Each seat base 70 and 74 preferably can also be formed with an integral seat cover attachment arrangement 88 and 90 that includes a plurality of pairs, e.g., at least three, of seat cover mounting tangs 92, each of each engages a corresponding pocket or through-hole 94 disposed in a gusset 95 seat cover 96 formed to fit the particular base to which it is attached. In FIG. 2, while only the driver seat cover 96 is shown, a pillion seat cover (not shown) having a shape complementary to that of the pillion base 74 can be formed in a like manner and attached to the pillion seat base the same way as the driver seat cover 96 is attachable to the driver seat base 70.

During assembly, a cushion 98, such as an open cell cushion, a closed cell foam cushion, or the like, is disposed, e.g., placed, inserted, cast, etc., within the cover 96 such that it overlies an outer support surface 100 of the base 70 to which the cover 96 is attached, positioning the cushion 98 between the base 70 and cover 94. The cushion 98 can be pre-formed and placed in the seat cover 96 in the manner depicted in FIG. 2 prior to the cover 96 being attached to the base 70. If desired, the cushion 98 can instead be first positioned over the support surface 100 of the base 70 before seat cover attachment is performed. The present invention is also versatile because it is advantageously compatible with a wide variety of cushion types, cushion configurations, cushion manufacturing processes, and cushion assembly methods.

FIGS. 3 and 4 illustrate one preferred frame mounting arrangement 84 used to mount the front of the driver seat base 70 to the motorcycle frame 44. The mounting arrangement 84 includes a fixed tongue 102 that projects outwardly from an integrally formed rib or tunnel 114 that extends downwardly from a molded support wall 104 of the base 70. While the fixed tongue 102 is preferably integrally formed of the base 70, it can also be a tongue insert (not shown) that is a component separate from the base 70 that is molded-in-place with the base 70. In a still further embodiment, the tongue can be formed of a separate component (not shown) that is attached to the base 70 using one or more fasteners, such as rivets or the like. Additionally, it is further understood that tongue 102 be constructed of the same or a different material than base 70.

The tongue 102 preferably is integrally molded with the base 70 when the base 70 is formed such that no separate component needs to be molded in place when making the base 70. This advantageously reduces the number of components while also decreasing base molding cycle time. The base 70 preferably is molded of plastic, such as a nylon, a high molecular weight polyethylene, polypropylene, or another suitable polymeric material. While thermoforming can be employed, the base 70 preferably is formed by molding, such as by injection molding, blow molding or the like. In one preferred embodiment, the base 70 is plastic injection molded.

In mounting the front of the base 70 to the frame 44, the base 70 is manipulated during assembly to align its tongue 102 with an upraised tubular mounting socket 106 defined by a corresponding open end of a tube 112 of generally rectangular cross section that is disposed between a pair of elongate and generally cylindrical frame tubes 108 and 110. The tongue 102 is telescopically inserted into the socket until it seats in the socket such as in the manner depicted in FIG. 4.

In one preferred method of mounting the driver seat base to the frame 44, the front of the base 70 is mounted to the motorcycle frame 44 in the aforementioned manner before mounting the rear of the base 70 to the frame 44 using the anchor bracket 72. Where a pillion is employed, the front of the pillion base 74 is engaged with anchor bolts 78 and the rear of the base 74 is mounted to the frame 44 via bracket plate 80.

FIGS. 5 and 6 illustrate another preferred embodiment of an integrally molded base anchoring tongue 102' that is of elongate and cantilevered construction. The tongue 102' cantilevers outwardly from a bottom surface 116 of the base support wall 103 forwardly toward the front of the base 70. The tongue 102' is received in a complementarily configured tubular frame socket (not shown) to mount the front of the base 70 to the frame 44.

Figure 8:
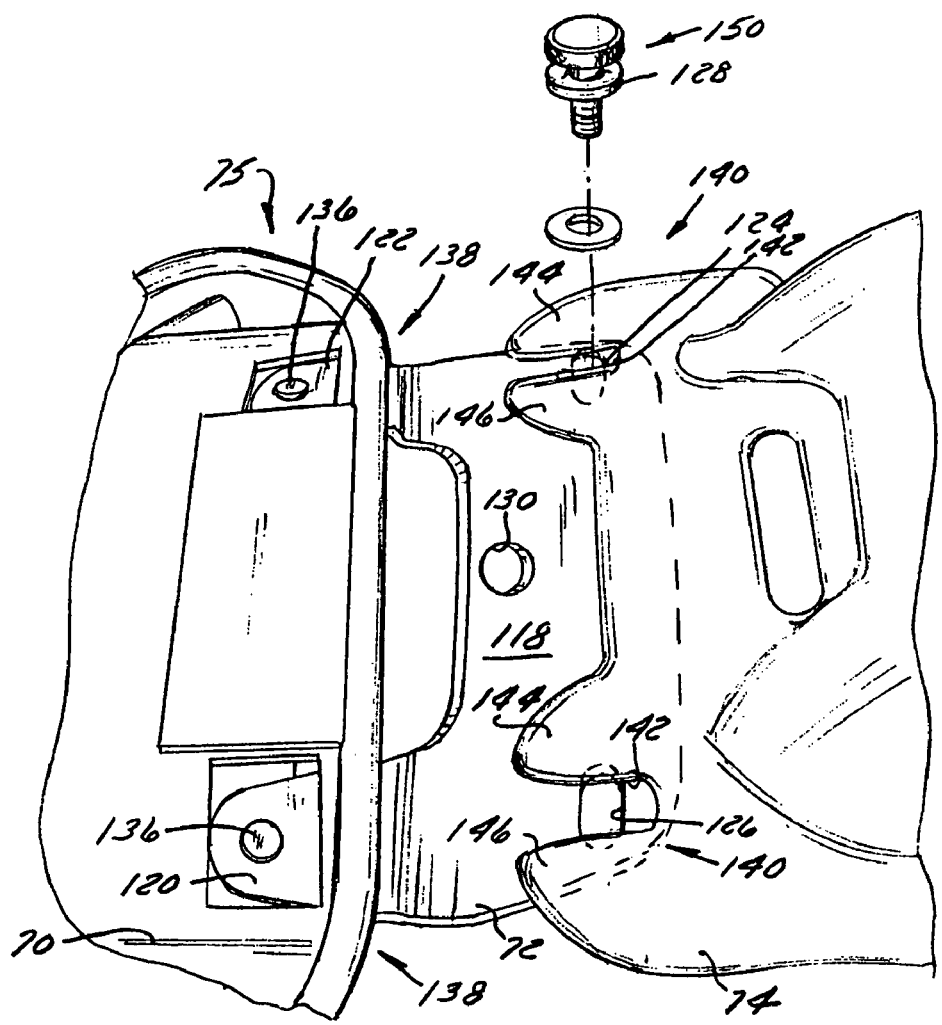

FIG. 7 illustrates the generally U-shaped or horseshoe shaped seat base anchor and pillion base coupling bracket 72 in more detail and FIG. 8 depicts the bracket 72 coupling the pillion base 74 to the driver seat base 70 while also simultaneously anchoring both bases 70 and 74 to the motorcycle frame 44. The bracket 72 includes a transversely extending sole plate 118 from which a pair of spaced apart generally parallel base-engaging arms 120 and 122 extend outwardly. Each arm 120 and 122 has a bore 134 through it for receiving a coupling boss 136 disposed in a coupling arm receiving channel 138 of the bracket cradle arrangement 75 integrally formed in the driver seat base 70.

The sole plate 118 has a plurality of through holes 124 and 126, each of which is for receiving a fastener 128 used to at least couple the pillion base 74 to the bracket 72. In the preferred bracket embodiment shown in FIGS. 7 and 8, the bracket 72 preferably also has a centrally located throughbore 130 disposed between through holes 124 and 126 that can receive another fastener 132 that can threadably engage the frame 44 to help mount the bracket 72 to the frame 44. In one preferred embodiment, each coupling fastener 128 also engages the frame 44 helping to anchor the bracket 72 and hence each connected seat base 70 and/or 74 to the frame 44. Fastener 128 preferably is a thumb-type shoulder or captive bolt and fastener 132 preferably is a bolt.

The pillion base 74 has a pair of spaced apart and generally parallel coupling forks 140, each of which includes a fastener shank receiving coupling slot 142 defined by a pair of outwardly extending integrally molded fork ears 144 and 146. The pillion base 74 is positioned so each slot 142 overlies a corresponding one of the coupling fastener holes 124 and 126, with each hole preferably being oblong in shape to facilitate assembly. That is, pillion base 74 is constructed to slidably engage a shoulder groove 150 of fasteners 128 such that pillion base 74 can be removed and connected to vehicle seat assembly without removing fasteners 128 therefrom.

Such a construction provides a seat assembly that can be quickly and efficiently adapted to a desired seat configuration.

Figure 9:
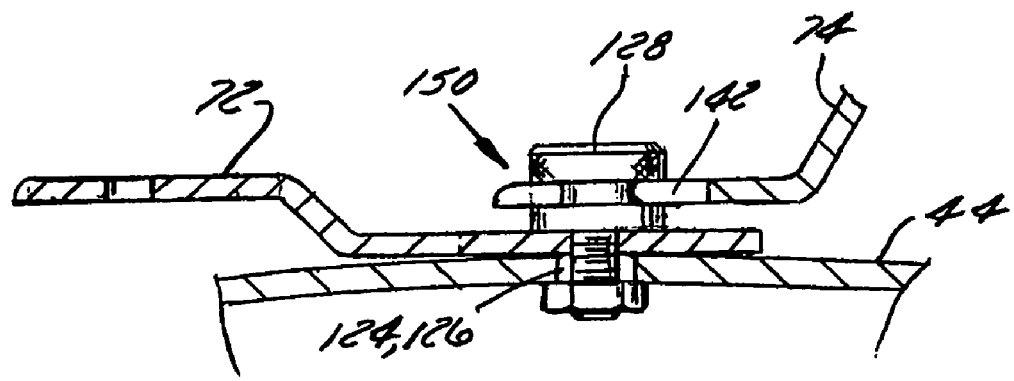
Figure 11:
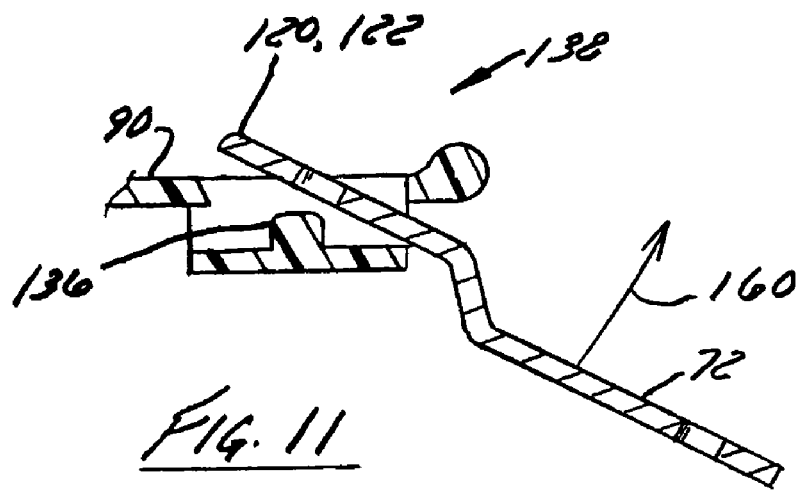
Figure 10:
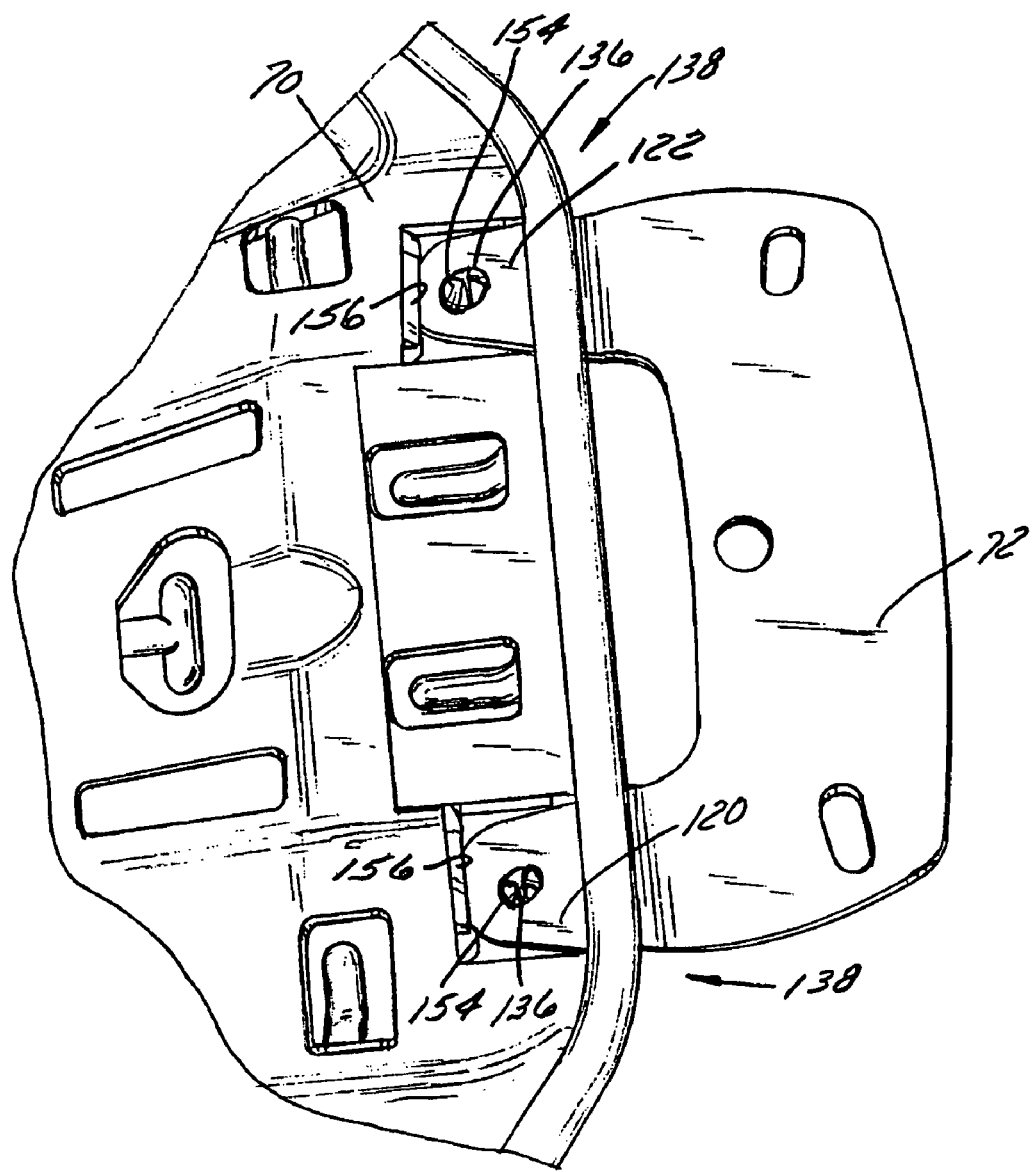

As shown in FIG. 9, fastener 128 passes through hole 124, 126 of bracket 72 and engages frame 44 thereby securing bracket 72 to frame 44. Coupling slot 142 slidingly engages shoulder groove 150 of fastener 128 and a front portion of pillion base 74 to frame 44. Referring to FIG. 10, bracket 72 is snap-fittingly connected to seat base 70. Arms 120, 122 of bracket 72 are engaged with channels 132 of seat base 70 and an aperture 154 formed in arms 120, 122 rotationally engages coupling boss 136. A tapered rib 156 engages an end of arms 120, 122 and snap-fittingly secures arms 120, 122 within receiving channels 138 when bracket 72 is engaged with seat base 70. FIG. 11 shows the direction of relative rotation, indicated by arrow 160, to connect bracket 72 to seat base 70. Arm 120, 122 is rotated downward over coupling 136 and an end of arm 120, 122 snap fitting passes tapered rib 156. Such a construction ensures the robust connection of bracket 72 and seat base 70 and prevents the inadvertent disconnection of seat base 70 and bracket 72.

Figure 12:
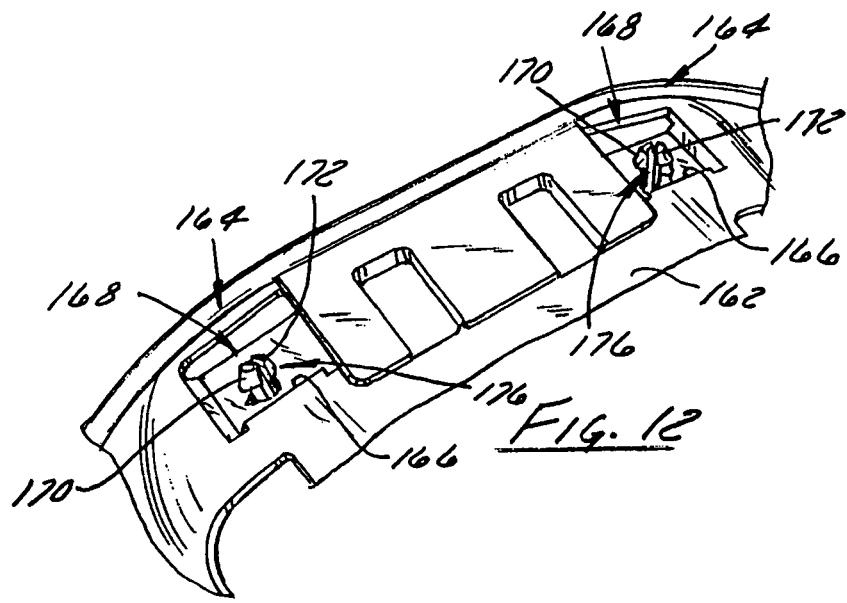
Figure 13:
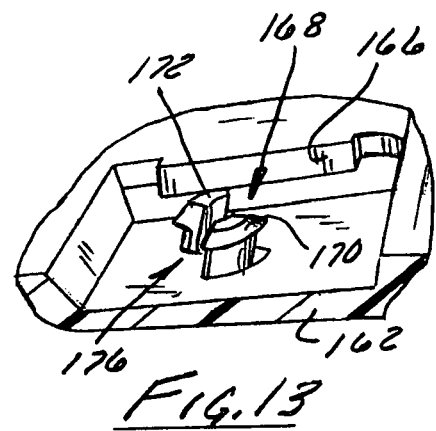
Figure 14:
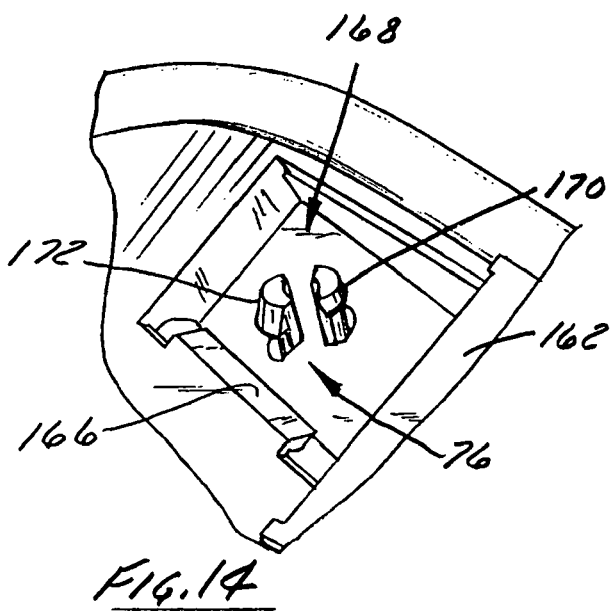
Figure 15:
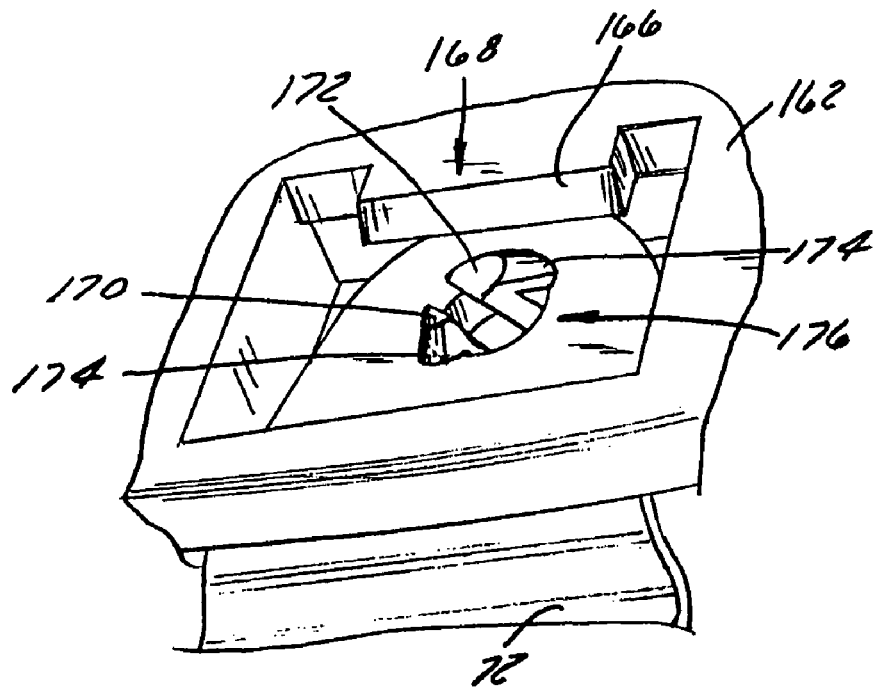
Figure 16:
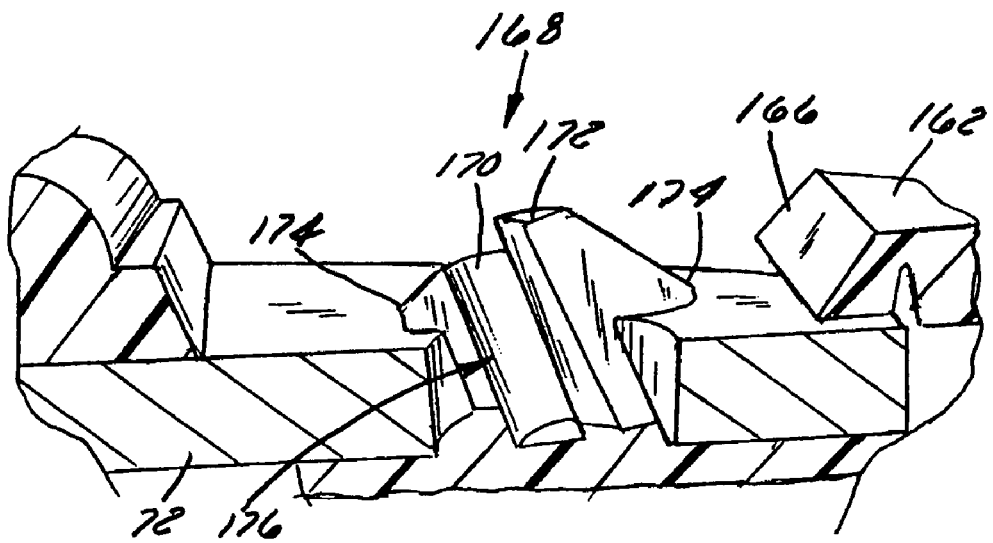

FIGS. 12-14 show an alternate embodiment of coupling boss 136. As shown in FIG. 11, a seat base 162 includes a pair of coupling channels 164. Each coupling channel has a tapered rib 166 positioned proximate a coupling boss 168. Each coupling boss 168 includes a pair of deflectable projections 170, 172 constructed to be deflected inward during the passage of arms 120, 122 of bracket 72 thereover. Projections 170, 172 include a barb 174 positioned at a distal portion of the projection. Barbs 174 snap-fittingly engage bracket 72 and secure the bracket to seat base 162. To remove bracket 72 from a seat base 162, a space 176 between adjacent projections allows the projections to be deflected inward thereby allowing bracket 72 to clear barbs 174. As shown in FIGS. 15-16, deflection of projections 170, 172 allow for the secure and repeatable connection of bracket 72 and base 162. When fully engaged with channel 164, barbs 174 prevent the inadvertent and unintentional removal of bracket 72 from seat base 162. Furthermore, when desired space 176 facilitates the convenient and expeditious removal of bracket 72 from base 162.

Figure 17:
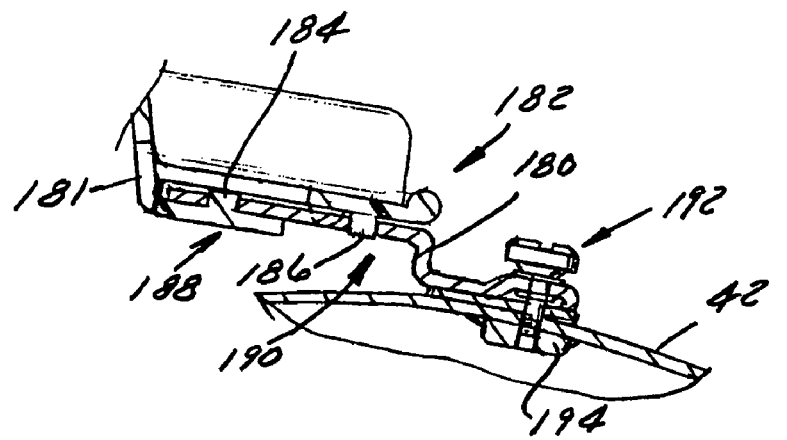
Figure 19:
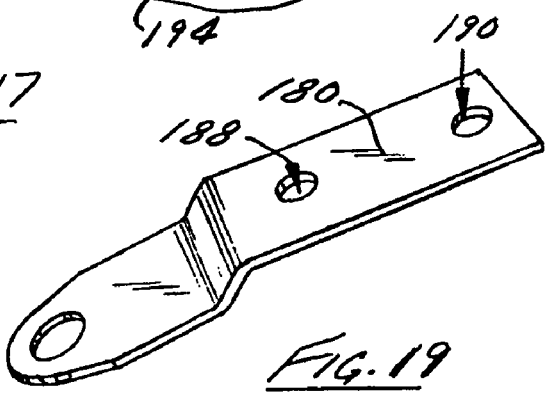

Heretofore, the discussion has primarily focused upon the connection of a main or operator seat with connection bracket 72. As previously discussed with respect to FIG. 9, the front of pillion seat base 74 operatively engages shoulder bolts 128 thereby securing the front of pillion seat base 74 to a vehicle frame via shoulder bolts. FIGS. 17-25 show various embodiments of the connection of a plate or rear connection bracket 180 and a seat base 181. Understandably, FIG. 17 is a cross-sectional view of the aft connection of either of a unitary seat base or a separate pillion base to a vehicle 42. A channel, recess, or pocket 182 is formed proximate rearwardly facing end 184 of base 181. A first projection 184 extends into pocket 182 and a second projection 186 extends from base 181 in a direction generally opposite to first projection 184. Rear connection bracket 180 includes a first opening 188 and a second opening 190 that are constructed to generally align with first projection 184 and second projection 186 when rear connection bracket 180 is engaged therewith. Openings 188, 190 and projections 184, 186 cooperate to provide a secure and severable connection between base 181 and rear connector plate 180 similar to the connection of operator seat base 72 and connector plate 72. A thumbscrew 192 passes through rear connector plate 180 and engages a nut 194 secured to vehicle 42. Alternatively, the connection of rear connector plate 180 and base 181 is configured to generally correspond the construction of the connection of seat base 74 connector 72.

Figure 20:
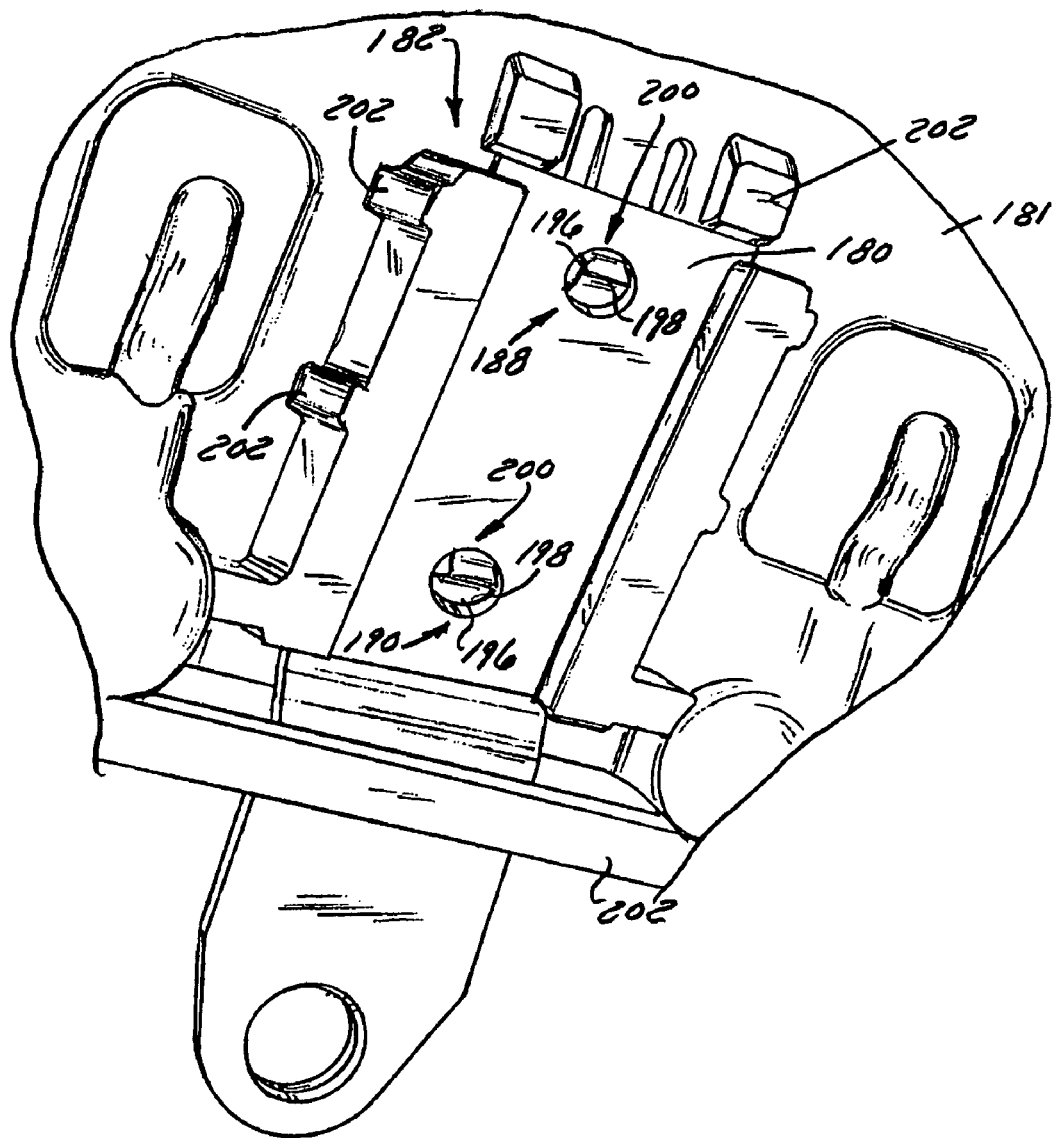
Figure 21:
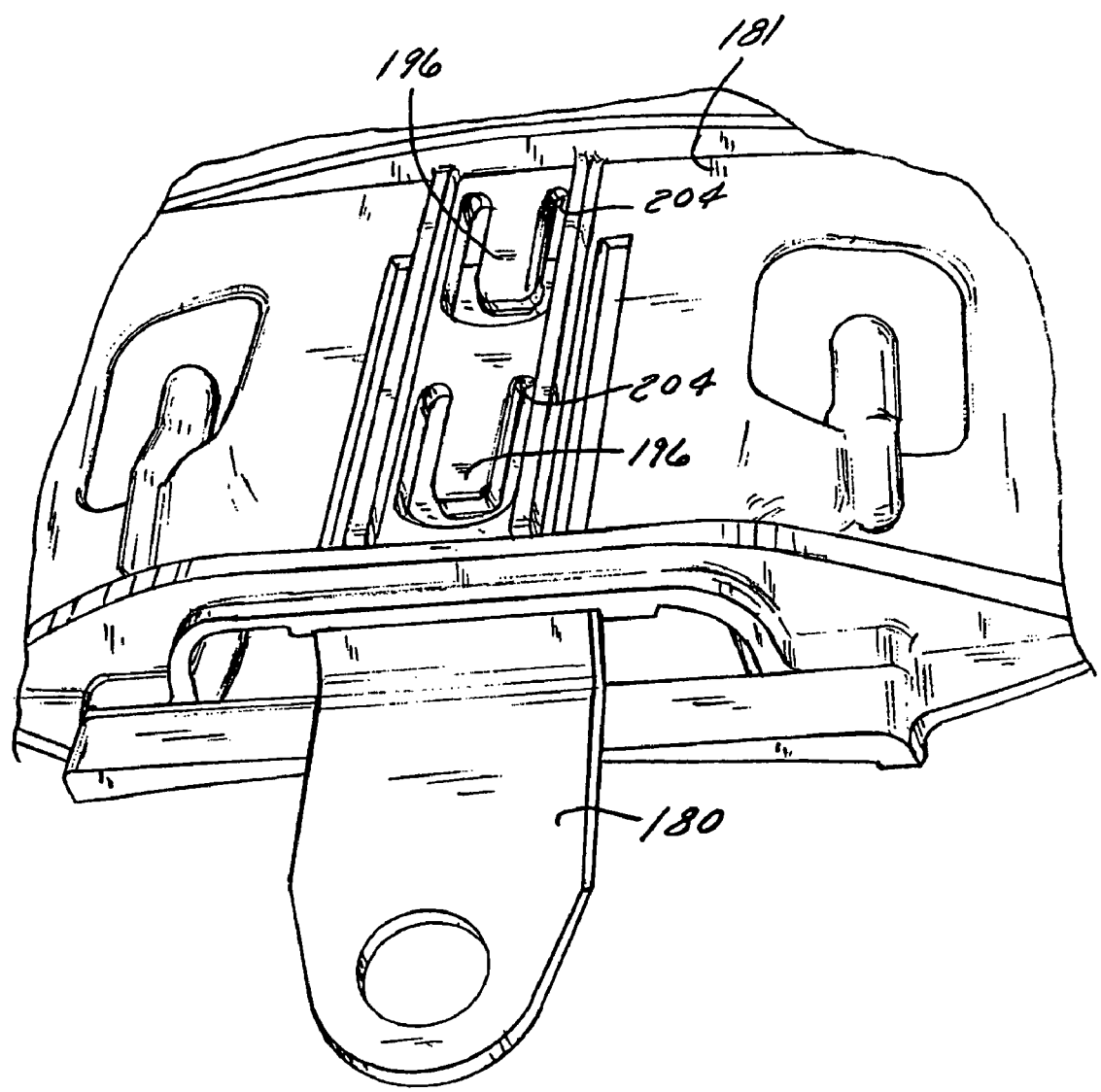
Figure 22:
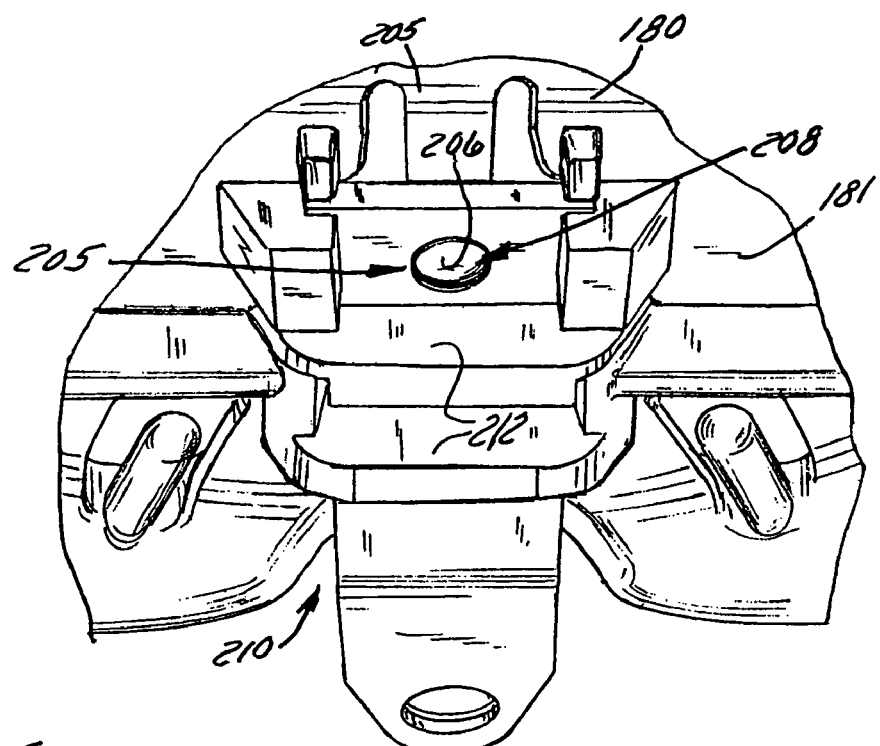
Figure 23:
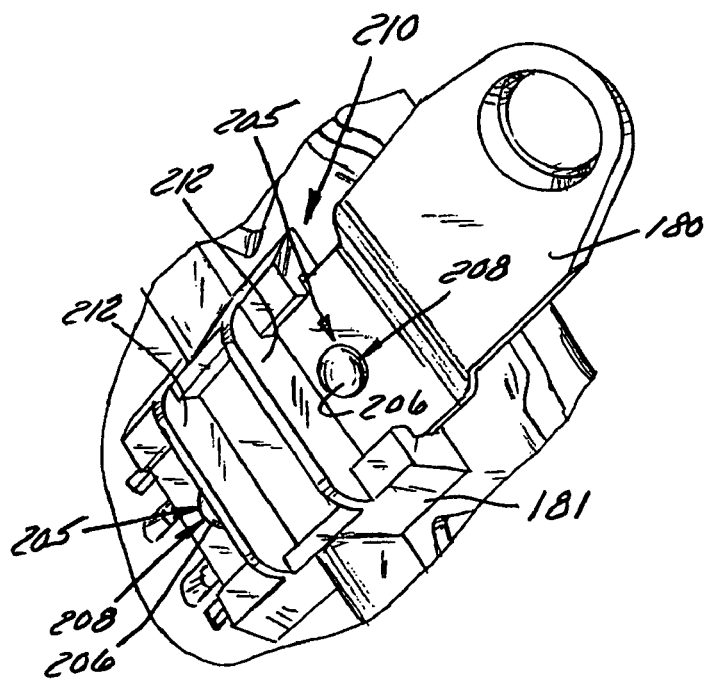
Figure 24:
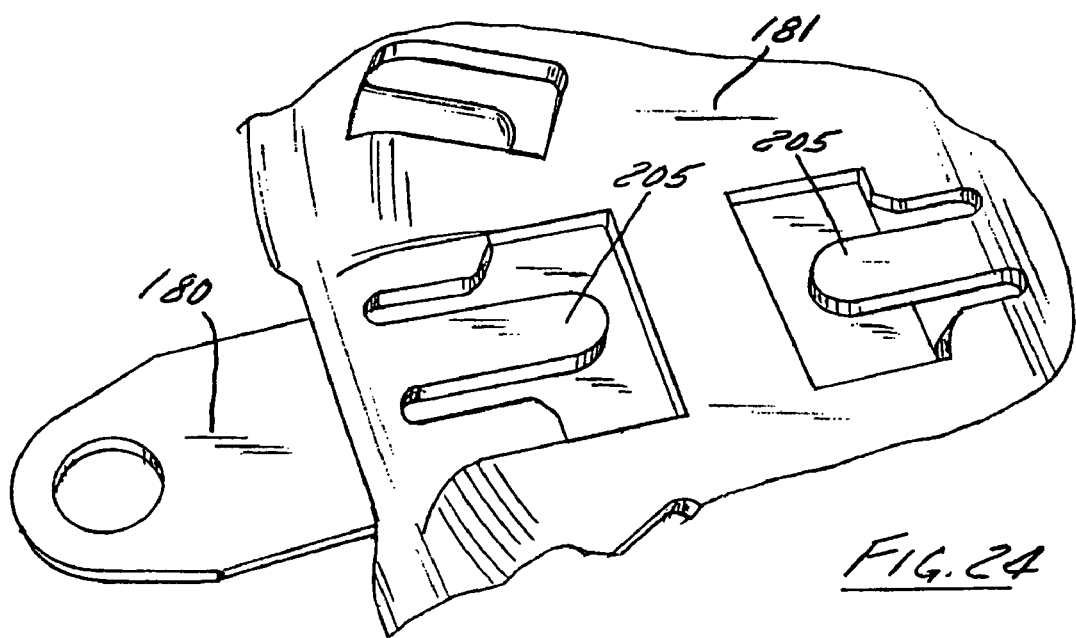
Figure 25:
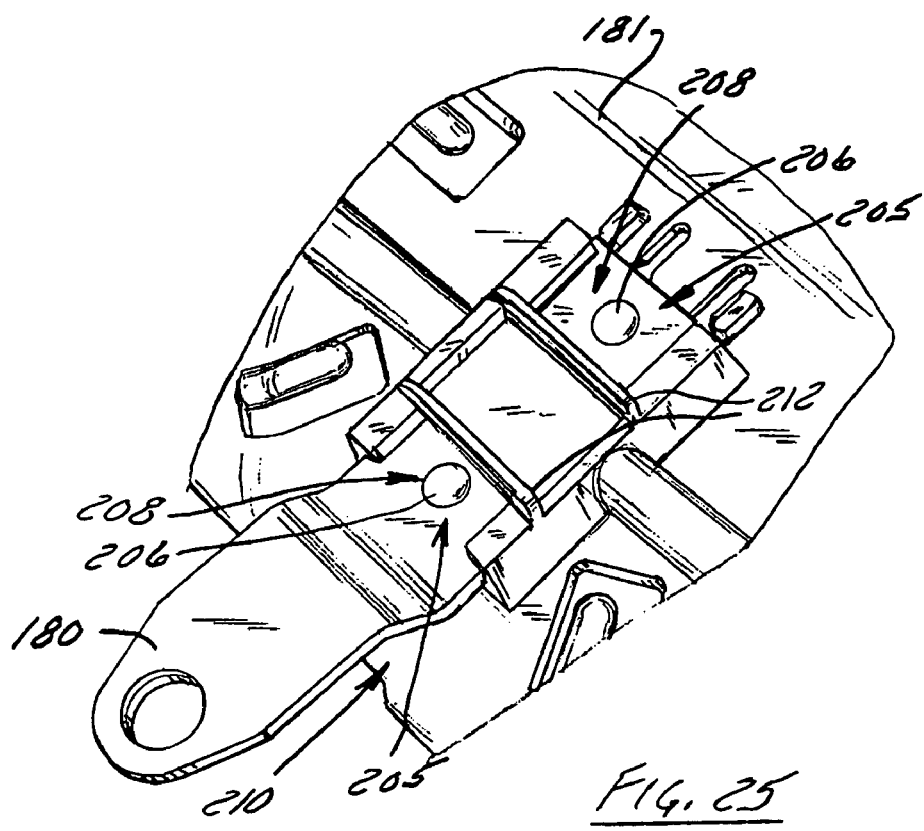

FIGS. 20-21 show an alternate embodiment of the connection of base 181 and rear connector plate 180. As shown in FIG. 20, connector plate 180 is translatable relative to base 181 and engages a pair of deflectable tabs 196 generally centrally positioned in channel or pocket 182. Each tab 196 includes a tapered end portion 198 and a lip 200 formed proximate thereto. As plate 180 is translated along pocket 182, tabs 196 engage openings 188, 190 of connector plate 180 and secure connector plate 180 within pocket 182. Pocket 182 includes a plurality of reinforcing ribs 202 positioned about pocket 182 and constructed to resist twisting and bending forces generated during operation of a vehicle equipped according thereto. Although the connection of connector plate 180 of base 181 is generally rigid and robust, it is also free of fasteners easily separable without the use of addition tools.

FIG. 21 shows a top perspective view of the connection of connector plate 180 and base 181. As shown therein, a channel 204 is formed about a perimeter of deflectable tabs 196 thereby allowing the tabs to move in a direction generally transverse to the axis of movement of connector plate 180. Such a construction allows the connector plate 180 to be slid into and out of pocket 182 when the tapered end portions 198 of the deflectable tabs 196 are disengaged from openings 188, 190 of connector plate 180. It is further appreciated to offset each of tabs 196 such that each tab can only engage one opening of connector plate 180.

FIGS. 22-25 show an alternate embodiment of the connection of connector plate 180 and base 181. Connector plate 180 is translatable relative to base 181 and engageable with a pair of deflectable tabs 205, each of which includes a projection 206 that extends from the tab and is configured to engage an opening 208 formed in plate 180. Connector plate 180 is slidably received in a channel or pocket 210 of base 181 such that projections 206 engage openings 208 and removably and without fasteners secure connector plate 180 to base 181. A pair ribs 212 extend across pocket 210 generally opposite tabs 205 and provide a robust and rigid connection of plate 180 and base 181. Regardless of which of the described connection modalities is employed between the respective components of the seat assembly, each of the connections provides a tool-free and fastener-free connection of mounting brackets with the seat base assemblies. Accordingly, a seat base, bracket, and plate assembly according to the present invention provides a multi-element seat assembly that can be quickly and efficiently manufactured and assembled without the expense and labor associated with providing, driving, and connecting fasteners. Accordingly the seat assembly provides a versatile and robust seat connection system.

FIGS. 27-39 show the structure and fixtures associated with the connection of a seat cover to a seat base. Understandably, the depicted seat base and cover constructions are merely exemplary and are in no way intended to limit the claims. That is, it is appreciated that the seat base and cover features disclosed herein can be configured to provide a seat of essentially any orientation, i.e. a unitary operator and passenger seat, an operator only seat, a passenger only or pillion seat, and/or a seat configured for another vehicle.

As shown in FIG. 26, a seat assembly 214 is contoured to form operator seat area 216 and passenger seat area 218. A cover 220 is maintained in tension across a top or operator side 222 of seat assembly 214. A cushion 224 disposed beneath cover 220 provides support and comfort for the operator and passenger during operation of a vehicle equipped with seat assembly 214. FIG. 27 shows the engagement of cover 220 with a base or seat base 226 of seat assembly 214. Cover 220 has an overhang or gusset 228 extending inboard from a perimeter of the seat base. Gusset 228 contains a plurality of openings, holes, or cover holes 230 which are offset a distance 232 from an edge 234 of gusset 228. Cover holes 230 are constructed to engage a plurality of protrusions, projections, or hooks 236 that extend from seat base 226. Distance 232 is sufficient to withstand the tensioning of cover 220 when an operator is positioned upon seat assembly 214 and hooks 236 and holes 230 are oriented and constructed to maintain a fastener free connection of cover 220 and base 226. Furthermore, the construction of holes 230 and hooks 236 allows for tool free or tool-less assembly of seat assembly 214. Additionally, the fastener free connection of cover 220 and seat base 226 provides for consistent and repeatable seat assembly construction.

FIG. 28 shows cover 220 removed from seat base 226. Gusset 228 of cover 220 is contoured to generally match the contour of a seat base to which the cover is to be connected. Cover holes 230 are positioned about a perimeter of the gusset so that the cover is generally uniformly tensioned across a base when the cover is connected thereto. Cushion 224 is contoured to generally match an intended contour of the seat when the cover is engaged with a base. The configuration of cover holes 230 ensures a repeatable and uniform seat appearance across a plurality of individual parts and a plurality of operators.

FIG. 29 shows a unitary seat base 238 constructed to engage cover 220 and to accommodate the fuel tank, frame, seat support, and fender of the vehicle and contoured to comfortably support an operator. Seat base 238 includes a plurality of projections, fingers, or tangs 240 which extend from the base and are constructed to engage the cover holes 230 of cover 220. The contour of seat base 238 is configured in accordance with the seats desired vehicle modality and accompanying vehicle frame. A grab strap bracket 242 is snap-fittingly connected to seat base 238 and includes a pair of grab strap tangs 244 constructed to engage a grab strap and secure the grab-strap to a vehicle. A tab 246 extends from grab strap bracket 242 and snap-fittingly connects bracket 242 to seat base 238. Tangs 240 are positioned about base 238 to attain a desired appearance of tension and contour of the cover attached thereto. Preferably, tangs 240 have a generally tubular cross-section and extend from a chamfered recess of base 238. Reducing the sharp contours between the tangs and the base minimizes stress concentrations associated with the engagement of cover 220 and each of tangs 240.

FIG. 30 shows an operator seat base 70 similar to that shown in FIG. 2. As shown in FIG. 30, seat base 70 includes a plurality of fingers, projections, or tangs 244 which extend from a body 246 of base 70. Tangs 244 are constructed to engage the cover openings of a cover configured to be attached to base 70. FIGS. 31 and 32 show alternate constructions of tangs 244. As shown in FIG. 31, tangs 244 could be constructed to extend generally transverse to body 246 of base 70 or, as shown in FIG. 32, tangs 244 could be elongated in one direction compared to another direction. It is appreciated that finger or tang constructions other than those shown are envisioned and within the scope of the claims. Additionally, it is further understood that, if so desired, a barb could be formed at the end of the tangs.

FIGS. 33 and 34 show alternate sides of pillion base 74 and the projections, tangs, or fingers 248 thereof. Forward end 250 of pillion base 74 is constructed to slidably engage shoulder bolts 78 as shown in FIG. 2. Fingers 248 are substantially curved and are positioned about pillion base 74 to securely tension a cover thereover. Such a construction provides a pillion seat assembly that is constructed to accommodate efficient and expeditious connection of the cover thereto. Additionally, such a construction ensures uniformity in the connection of the cover to the base among a plurality of parts and a plurality of assemblers.

FIGS. 35-37 show the engagement of cover 220 with any of base 72, 74, 238. As shown in FIG. 35, hand tensioning of cover 220 generates sufficient slack 252 to position cover holes 230 over tangs, fingers, or projections 236, 240, 244, 248. Additionally, as shown in FIG. 36, an optional tool 254 is envisioned to simplify the alignment of holes 230 with projections 236, 240, 244, 248. As shown in FIG. 37, when cover 220 is positioned over projections 236, 240, 244, 248 and manual tensioning of the cover 220 is released, cushion 224 tensions cover 220 between opposing projections 236, 240, 244, 248 to generally uniformly tension cover 220 thereacross. Such a construction provides a cover and base association that is simple to assemble and highly repeatable.

A seat assembly constructed according to the present invention provides a seat assembly having a cover that is quickly and easily connected to the seat base. The tool and fastener free connection of the seat cover with the seat base provides for a convenient, repeatable, and secure connection of the seat cover with the seat base. A seat assembly constructed according to the present invention also provides for the convenient and expeditious connection of a plurality of seat assembly elements. The fastener free connection between the multiple components of the seat assembly provides for the economical manufacture and assembly of the seat assembly. Such a construction provides a multi-piece seat assembly wherein the components of the seat assembly can be connected without fasteners and without tools.

Therefore, one embodiment of the present invention includes a seat assembly having a cover that has a generally uniform cross-section extending to a perimeter of the cover. A plurality of openings are formed in the cover generally about the perimeter. The seat assembly includes a base having a plurality of protrusions that extend therefrom. Each protrusion is constructed to engage one of the plurality of openings of the cover to secure the cover to the base.

According to another embodiment of the invention, a seat assembly includes a base, a pad positioned about a side of the base, and a cover. A plurality of hooks project from the base and the cover is tensioned over the pad and toolessly engaged with the plurality of the hooks.

A further embodiment of the invention includes a method of assembling a seat that includes the steps of: (A) compressing a cushion between a base and a cover; (B) toolessly hooking a plurality of openings in the cover to the base; and (C) releasing the compression of the cushion to generally uniformly tension the cover over the base.

Yet another embodiment of the invention is a motorcycle seat assembly that includes a seat having a first end with a tab extending therefrom and a second end with a pocket formed thereat. The seat assembly includes a pillion having a first end and a second end wherein the first end is constructed to be secured to a motorcycle and the second end is constructed to toolessly connect to the seat.

A further embodiment of the invention includes a multi-person motorcycle seat assembly having a first seat and a second seat. The first seat is constructed to support an operator and the second seat is constructed to support a passenger and snapfittingly connect to the first seat.

What we claim is:
1. A motorcycle seat assembly comprising:
 a seat comprised of a seat base having a first end with a tab extending therefrom that couples the seat base with one part of a frame of a motorcycle and a second end with a pocket formed thereat;

a connection bracket having a portion received in the pocket coupling the bracket to the second end of the seat base;

wherein the connection bracket is fixed to another part of the motorcycle frame;

wherein the seat is anchored to the motorcycle frame by the seat base being coupled to the one part of the frame and being coupled to the connection bracket;

wherein the portion of the connection bracket that is received in the pocket is an outwardly extending projection constructed to engage the seat base when disposed in the pocket in coupling the seat to the seat base, the outwardly extending projection having an opening formed therein;

a pin extending into the pocket constructed to be releasable received in the opening in the projection of the bracket when the projection is received in the pocket preventing withdrawal of the projection of the bracket from the pocket; and wherein the projection is slidable in a first direction and the pin is slidable in a second direction relative to the pocket.

2. The motorcycle seat assembly of claim 1 further comprising another projection extending from the connection bracket and another pocket formed on the seat.

3. The motorcycle seat assembly of claim 2 wherein the projection and the another projection and the pocket and another pocket are generally aligned.

4. The motorcycle seat assembly of claim 2 wherein the projection and another projection and the pocket and another pocket are generally mirror images, respectively.

5. The motorcycle seat assembly of claim 1 further comprising a cover constructed to be toollessly connected to the seat.

6. The motorcycle seat assembly of claim 5 further comprising a plurality of hooks extending from the seat and a plurality of openings formed in the cover, the openings constructed to engage the hooks to tension the cover across the seat and wherein the cover has a generally uniform cross section extending to a perimeter of the cover.

7. The motorcycle seat assembly of claim 1 wherein the connection bracket is fixed to the another part of the motorcycle frame by a fastener.

8. The motorcycle seat assembly of claim 1 wherein the seat base comprises a driver seat base, further comprising a passenger seat base having a first end that is attached to the connection bracket and having a second end with a pocket formed thereat, and further comprising a connection plate fixed to a further part of the motorcycle frame and having a portion that is received in the pocket coupling the passenger seat base to the connection plate.

9. The motorcycle seat assembly of claim 8 wherein the first end of the passenger seat base is attached to the connection bracket by at least one fastener and wherein the connection plate is fixed to the further part of the motorcycle frame by a fastener.

10. A multi-person motorcycle seat assembly comprising:
a first seat constructed to support an operator;
a second seat constructed to support a passenger;
a connector bracket constructed to snap-fittingly engage one of the first seat and the second seat and be secured to a motorcycle;
further comprising a pocket formed on one of the first seat and the second seat wherein the connector bracket has a portion at one end that is receivable in the pocket in engagement with the one of the first seat and second seat and be retained therein;

wherein the connector bracket has a hole formed therein in the portion that is receivable in the pocket;

wherein the one of the first seat and second seat comprises a projection disposed in the pocket that is receivable in the hole in the connector bracket engaging the portion of the connector bracket received in the pocket; and wherein the portion of the connector bracket that is receivable in the pocket is translatable relative to the pocket and the projection deflects about the portion of the connector bracket that is receivable in the pocket.

11. The seat assembly of claim 10 further comprising a second pocket formed on the one of the first seat and the second seat and wherein the connector bracket has a second portion that is receivable in the second pocket and be retained therein.

12. The seat assembly of claim 10 wherein the projection is constructed to snuggly engage the hole.

13. The seat assembly of claim 10 further comprising a cover disposed across one of the first seat and the second seat and snapfittingly connected thereto.

14. The seat assembly of claim 13 wherein the cover further comprises a plurality of openings formed therein constructed to directly engage a plurality of hooks extending from the one of the first seat and the second seat.

15. The seat assembly of claim 14 wherein the plurality of openings are offset from a perimeter of the cover a distance sufficient to withstand a loaded tension of the cover.

16. The seat assembly of claim 14 wherein each of the plurality of hooks includes a generally curvilinear cross-section.

17. The seat assembly of claim 10 further comprising a plurality of hooks extending from an underside of one of the first seat and the second seat and constructed to toollessly secure a cover thereto.

18. A motorcycle seat assembly comprising:
a motorcycle seat comprised of an elongate three dimensionally contoured seat base having a tongue extending outwardly from at or adjacent one end and at least one socket disposed at or adjacent the opposite end;
a first portion of a frame of a motorcycle comprising a socket in which the tongue is received;
a bracket fixed to a second portion of the motorcycle frame and having at least one portion that is received in the at least one socket in the seat base;
wherein snap fit engagement is provided between the at least one portion of the bracket and the seat base when the at least one portion of the bracket is received in the at least one socket in the seat base;
wherein the seat base has a front end and a rear end and the tongue extends outwardly from at or adjacent the front end and the at least one socket is disposed at or adjacent the rear end; and
wherein the at least one socket of the seat base comprises a pair of channels formed in the rear end of the seat base and the at least one portion of the bracket comprises a pair of spaced apart arms of the bracket that are each received in a corresponding channel in the rear end of the seat base.

19. The motorcycle seat assembly of claim 18 wherein the tongue and at least one socket are integrally formed in the seat base, wherein the first portion of the motorcycle frame comprises a tube and the socket comprises an open end of the tube, wherein the bracket is fixed to the second portion of the motorcycle frame by a fastener, and wherein a part of the seat base extends into the at least one socket and engages a part of the at least one portion of the bracket when the at least one portion of the bracket is received in the at least one socket in the seat base.

20. The motorcycle seat assembly of claim 18 wherein the seat base comprises an operator seat base, further comprising a passenger seat base adjacent the operator seat base that is attached at one end to the bracket and that has a socket disposed at or adjacent an opposite end, and further comprising a connector fixed to a third portion of the motorcycle frame with the connector having a tongue that is receivable in the socket of the passenger seat base.

* * * * *

UNITED STATES PATENT AND TRADEMARK OFFICE
CERTIFICATE OF CORRECTION

| | | |
|---|---|---|
| PATENT NO. | : 7,837,260 B2 | Page 1 of 1 |
| APPLICATION NO. | : 11/421461 | |
| DATED | : November 23, 2010 | |
| INVENTOR(S) | : Scott Hein et al. | |

It is certified that error appears in the above-identified patent and that said Letters Patent is hereby corrected as shown below:

ON THE FACE

(73) Assignee:

Please amend the assignee to read:

-- Milsco Manufacturing Company, a Unit of Jason Incorporated --

IN THE CLAIMS

CLAIM 1, column 11, line 15, delete "releasable" and substitute therefore -- releasably --

Signed and Sealed this
Twenty-second Day of March, 2011

David J. Kappos
*Director of the United States Patent and Trademark Office*